United States Patent
Ikemoto et al.

(10) Patent No.: US 11,865,918 B2
(45) Date of Patent: Jan. 9, 2024

(54) DISPLAY CONTROL DEVICE, DISPLAY CONTROL SYSTEM, AND DISPLAY CONTROL METHOD

(71) Applicant: Panasonic Intellectual Property Management Co., Ltd., Osaka (JP)

(72) Inventors: Naoki Ikemoto, Osaka (JP); Nobutaka Kitajima, Osaka (JP); Mutsumi Kawagoe, Osaka (JP); Kenji Oga, Osaka (JP); Masakazu Nakazawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/884,361

(22) Filed: Aug. 9, 2022

(65) Prior Publication Data
US 2023/0114559 A1 Apr. 13, 2023

(30) Foreign Application Priority Data
Sep. 29, 2021 (JP) .................. 2021-160167

(51) Int. Cl.
*B60K 35/00* (2006.01)
*G06F 3/01* (2006.01)

(52) U.S. Cl.
CPC .............. *B60K 35/00* (2013.01); *G06F 3/013* (2013.01); *B60K 2370/149* (2019.05);
(Continued)

(58) Field of Classification Search
CPC .............. B60K 35/00; B60K 2370/149; B60K 2370/182; B60K 2370/774;
(Continued)

(56) References Cited

U.S. PATENT DOCUMENTS 9,767,693 B2 * 9/2017 Lee .................. G08G 1/166
2017/0015198 A1 1/2017 Suzuki
(Continued)

FOREIGN PATENT DOCUMENTS

JP 2007-145310 6/2007
JP 6281376 2/2018

OTHER PUBLICATIONS

Notice of Reasons for Refusal, dated Aug. 8, 2023 in Japan Patent Application No. 2021-160167, together with English translation thereof.

*Primary Examiner* — Christopher E Leiby
(74) *Attorney, Agent, or Firm* — GREENBLUM & BERNSTEIN, P.L.C.

(57) ABSTRACT

The display control device includes a controller that controls a first display and a second display to control displaying of first information and second information. The controller obtains gaze information indicating a driver's gaze, and the driver's gaze indicated by the gaze information is directed at neither the first display nor the second display. In the situation, if a second event further occurs while the first display is displaying the first information because of the occurrence of a first event, the controller changes the display position of the second information to display the second information on the first display. In the situation, if the first event further occurs while the second display is displaying the second information because of the occurrence of the second event, the controller changes the display position of the first information to display the first information on the second display.

20 Claims, 11 Drawing Sheets

(52) U.S. Cl.
CPC .. *B60K 2370/182* (2019.05); *B60K 2370/188* (2019.05); *B60K 2370/52* (2019.05); *B60K 2370/774* (2019.05); *B60Y 2200/11* (2013.01)

(58) Field of Classification Search
CPC .......... B60K 2370/188; B60K 2370/52; G06F 3/013; B60Y 2200/11
See application file for complete search history.

(56) References Cited

U.S. PATENT DOCUMENTS

| | | | |
|---|---|---|---|
| 2018/0032300 A1* | 2/2018 | Singh | G06F 3/013 |
| 2021/0197668 A1* | 7/2021 | Tian | B60K 35/00 |
| 2022/0305913 A1* | 9/2022 | Nara | B60K 35/00 |
| 2022/0306142 A1* | 9/2022 | Taniguchi | B60W 30/09 |

\* cited by examiner

DISPLAY CONTROL DEVICE, DISPLAY CONTROL SYSTEM, AND DISPLAY CONTROL METHOD

CROSS REFERENCE TO RELATED APPLICATION

The present application is based on and claims priority of Japanese Patent Application No. 2021-160167 filed on Sep. 29, 2021.

FIELD

The present disclosure relates to a display control device, a display control system, and a display control method.

BACKGROUND

Patent Literature 1 (PTL 1) discloses an information display system that displays different information items on individual displays and includes a gaze identifier and a guidance processing executer. The gaze identifier identifies a driver's gaze. When the driver's gaze identified by the gaze identifier is not directed at a display displaying information, the guidance processing executer performs guidance processing to guide the driver's gaze toward the display displaying the information.

CITATION LIST

Patent Literature

PTL 1: Japanese Patent No, 6281376

SUMMARY

The information display system disclosed in PTL 1 can be improved upon.

Further improvement can be achieved using a display control device, a display control system, and a display control method in the present disclosure.

A display control device according to one aspect of the present disclosure is a display control device used in a vehicle equipped with a first display that displays first information corresponding to a first event and a second display that displays second information corresponding to a second event. The display control device includes a controller that controls the first display and the second display to control displaying of the first information and the second information. In a situation in which the controller obtains gaze information indicating a driver's gaze and the driver's gaze indicated by the gaze information obtained is directed at neither the first display nor the second display, if the second event further occurs while the first display is displaying the first information because of occurrence of the first event, the controller changes the display position of the second information to display the second information at least on the first display, and if the first event further occurs while the second display is displaying the second information because of occurrence of the second event, the controller changes the display position of the first information to display the first information at least on the second display.

It should be noted that these general or specific aspects may be embodied as a system, a device, a method, a recording medium, or a computer program or by any combination of the system, the device, the method, the recording medium, and the computer program.

Further improvement can be achieved using, for example, a display control device in the present disclosure.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
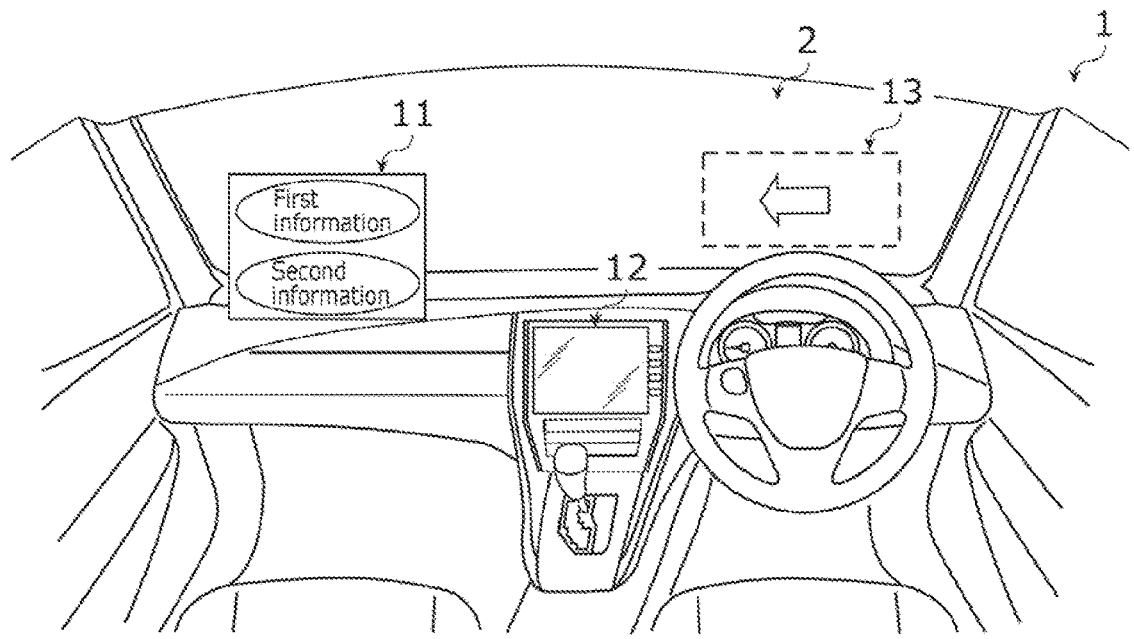
FIG. 1 illustrates the displays of a display control system according to an embodiment, with which a vehicle is equipped.

Hereinafter, an embodiment is described in detail with reference to the drawings.

It should be noted that the embodiment described below provides general or specific examples. The numerical values, shapes, structural elements, positions and connections of the structural elements, steps, order of the steps, and other details described in the embodiment below are mere examples and are not intended to limit the present disclosure. In addition, among the structural elements described in the embodiment below, the structural elements not included in the independent claims are described as optional structural elements.

In addition, the drawings are schematic views and are not necessarily precisely drawn. Accordingly, the scales in the drawings are not necessarily identical. In the drawings, substantially the same elements are assigned the same reference symbols, and overlapping explanations are omitted or simplified.

EMBODIMENT

Configuration

Figure 2:
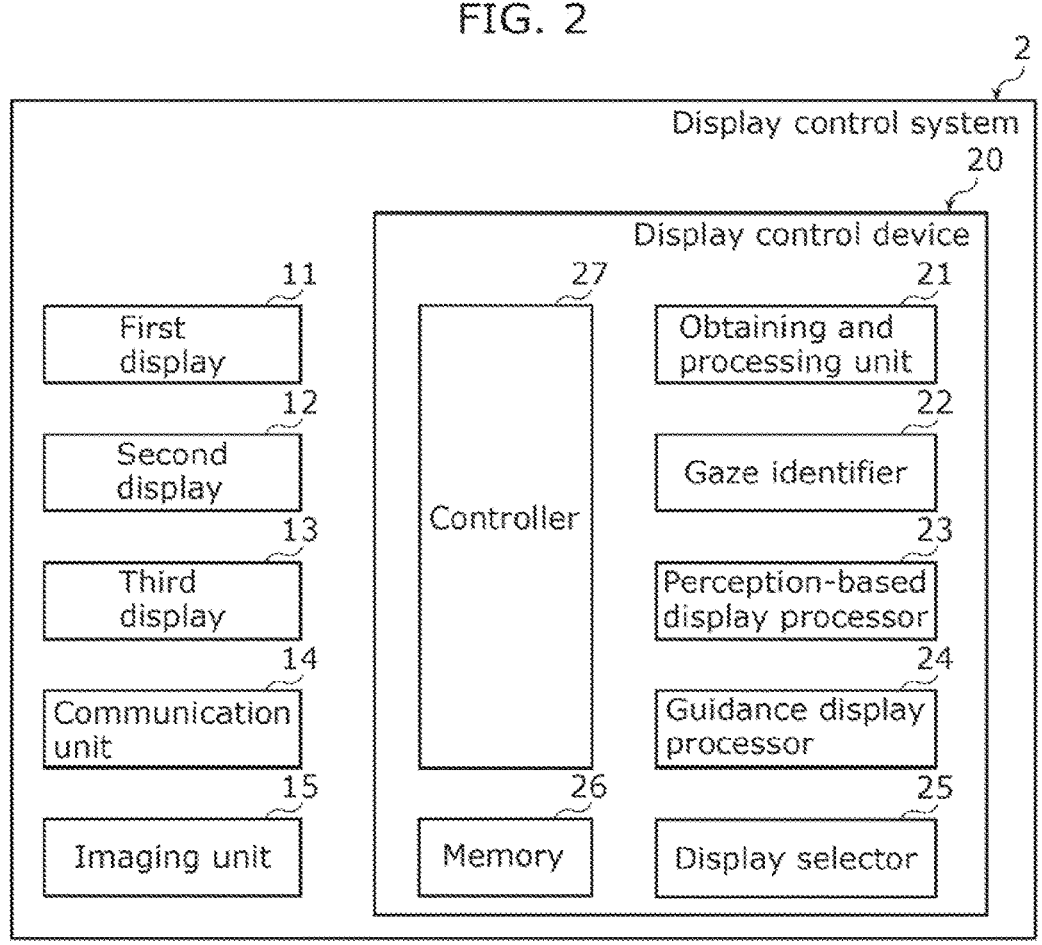
FIG. 2 is a block diagram illustrating the display control system according to the embodiment.

FIG. 1 illustrates the displays of display control system 2 according to an embodiment, with which vehicle 1 is equipped, FIG. 1 illustrates an example of the interior of vehicle 1. It should be noted that FIG. 1 illustrates an example in which first display 11 is displaying first information and second information together. Second display 12 and/or third display 13 may each display the first information and the second information together. The same applies to the subsequent figures. FIG. 2 is a block diagram illustrating display control system 2 according to the embodiment.

As illustrated in FIGS. 1 and 2, display control system 2 is an in-vehicle system in vehicle 1. Vehicle 1 is equipped with displays including first display 11, second display 12, and third display 13. Display control system 2 causes the displays to display information. If a driver is not looking at the information displayed on the displays, display control system 2 guides a driver's gaze toward one of the displays displaying the information.

Specifically, display control system 2 includes the displays, communication unit 14, imaging unit 15, and display control device 20.

Displays

The displays are in-vehicle displays, such as a center display, a head-up display (HUD), a meter display, and a passenger display with which vehicle 1 is equipped. In addition, when vehicle 1 is driven in reverse, the displays display images taken by imaging unit which enables the displays to function as rear-view monitors.

The displays include first display 11, second display 12, and third display 13. It should be noted that FIG. 1 illustrates three displays for purposes of illustration and not limitation. Display control system 2 may include four or more displays or two displays, In addition, first display 11, second display 12, and third display 13 are examples of the displays.

For instance, FIG. 1 illustrates an example in which first display 11 is a passenger display. First display 11 is suitable to display, for example, music information and multimedia information, as with an audio device, a car television, and other devices with which vehicle 1 is equipped. Here, the music information is information related to music. The multimedia information is dynamic content related to a video and music.

In addition, FIG. 1 illustrates an example in which second display 12 is a center display. Second display 12 is suitable to display, for example, navigation information, as with a navigation device and other devices with which vehicle 1 is equipped. Here, the navigation information is information related to the direction of travel notified by a sound and/or an arrow icon at, for example, intersections and forks as route guidance.

In addition, FIG. 1 illustrates an example in which third display 13 is a head-up display. Third display 13 is suitable to display guidance.

It should be noted that the positions of first display 11, second display 12, and third display 13 and the functions of displaying information are mere examples.

Information items displayed on first display 11, second display 12, and third display 13 are not limited to the above examples. That is, each of first display 11, second display 12, and third display 13 can display, for example, surrounding information, navigation information, music information, multimedia information, disaster information, measuring-instrument information, and traffic information.

Here, the surrounding information is information related to, for example, the distances to obstacles, such as other vehicles, people, walls, and utility poles around vehicle 1, the speeds at which traveling objects, such as the other vehicles and the people, travel, and the directions in which the traveling objects travel. In addition, the disaster information is information related to, for example, the location of an accident, a description of the accident, the location of a disaster, and a description of the disaster. The measuring-instrument information is vehicle information related to, for example, the speed of vehicle 1, the engine revolution, and the remaining amount of gasoline. The traffic information is information related to, for example, traffic conditions (e.g., congestion levels, congested locations), travelable roads, and roads closed to traffic.

When viewed in the direction in which vehicle 1 travels, first display 11 is to the left of second display 12. In addition, second display 12 is provided in the center in the lateral direction of vehicle 1, near the instrument panel of vehicle 1. Thus, the driver can look at first display 11 and second display 12 by looking away from the windshield of vehicle 1.

In addition, when viewed in the direction in which vehicle 1 travels, third display 13 is to the right of second display 12. Specifically, third display 13 is in front of the steering wheel and the driver's seat. That is, when the driver drives vehicle 1, third display 13 is in the direction in which the driver mainly looks. Thus, third display 13 is at a position easy for the driver to look at.

Communication Unit 14

Communication unit 14 is, for example, a communication interface with which vehicle 1 is equipped and enables communication between vehicle 1 and an external terminal. In addition, communication unit 14 obtains information items, such as surrounding information, disaster information, and traffic information, from external terminals and outputs the obtained information items, such as the surrounding information, the disaster information, and the traffic information, to display control device 20. Thus, display control device 20 can cause the displays to display the information items, such as the surrounding information, the disaster information, and the traffic information. It should be noted that display control device 20 may include communication unit 14.

Imaging Unit 15

Imaging unit 15 is, for example, an in-vehicle camera with which vehicle 1 is equipped and can take an image of at least a part of the surroundings of vehicle 1 and an image of interior of vehicle 1. Imaging unit 15 can cause at least one of the displays to display an image of at least a part of the surroundings of vehicle 1.

In addition, imaging unit 15 can take an image of the interior of vehicle 1. Imaging unit 15 may output an image of the driver to gaze identifier 22 of display control device 20.

Display Control Device 20

Display control device 20 is used in vehicle 1 equipped with first display 11 and second display 12. First display 11 displays first information corresponding to a first event, and second display 12 displays second information corresponding to a second event. For instance, when an event in which another vehicle approaches vehicle 1 occurs while the driver is driving vehicle 1, display control device 20 obtains information corresponding to the event and indicating the approach of another vehicle. Display control device 20 then causes first display 11 and/or second display 12 to display the information indicating the approach of another vehicle. Display control device may obtain information corresponding to such an event from another vehicle, an external device of vehicle 1, or imaging unit 15 with which vehicle 1 is equipped.

Here, the first event and the second event include, for example, decreased distances between vehicle 1 and obstacles, which are a traveling object and an object, as a result of, for example, a traveling object approaching the left or right side of vehicle 1 or backing vehicle 1 approaching an object, provision of route guidance at, for example, intersections and forks, occurrence of an accident or a disaster, an indication of an insufficient amount of remaining gasoline, occurrence of traffic jam, and occurrence of road closure.

It should be noted that the first information and the second information are, for example, surrounding information including information indicating the approach of an obstacle, navigation information including information indicating route guidance provided at, for example, intersections and forks, disaster information including information indicating the location of an accident or a disaster and a description of the accident or the disaster, measuring-Instrument information including information indicating an insufficient amount of remaining gasoline, and traffic information including information indicating congested locations and roads closed to traffic.

Specifically, display control device 20 includes obtaining and processing unit 21, gaze identifier 22, perception-based display processor 23, guidance display processor 24, display selector 25, memory 26, and controller 27. In display control device 20, obtaining and processing unit 21, gaze identifier 22, perception-based display processor 23, guidance display processor 24, and display selector 25 may be hypothetically achieved as software by controller 27 running a control program. In addition, in display control device 20, controller 27, obtaining and processing unit 21, gaze identifier 22, perception-based display processor 23, guidance display processor 24, and display selector 25 may be embodied as a single integrated circuit, that is, as hardware.

Obtaining and processing unit 21 obtains information items indicating content displayed on first display 11 and content displayed on second display 12. Then, obtaining and processing unit 21 outputs, to display selector 25, the obtained information items indicating the content displayed on first display 11 and the content displayed on second display 12. This enables display selector 25 to select a display to be caused to display information. In addition, obtaining and processing unit 21 may obtain an information item indicating content displayed on third display 13. In this case, obtaining and processing unit 21 may output, to display selector 25, the obtained information item indicating the content displayed on third display 13.

Gaze identifier 22 identifies a driver's gaze by performing known gaze analysis processing to identify a driver's gaze. Specifically, gaze identifier 22 extracts driver's eyeballs from at least one image of the driver taken by imaging unit 15 and identifies the driver's gaze from, for example, the movement and state of the extracted eyeballs. In addition, gaze identifier 22 identifies the driver's gaze to output gaze information to, for example, controller 27 and guidance display processor 24. Here, the gaze information indicates the driver's gaze.

Identifying of the driver's gaze enables gaze identifier 22 to also identify the position of a driver's gaze point from the identified gaze. Here, the driver's gaze point is a point which the driver fixedly looks at and a particular point that is an object of the driver's gaze in a driver's gaze direction.

Perception-based display processor 23 determines whether the gaze indicated by the gaze information output by gaze identifier 22 is directed at one of the displays. That is, perception-based display processor 23 identifies, from the displays, a display which the gaze identified by gaze identifier 22 is directed at and is present in a driver's gaze direction. In the embodiment, perception-based display processor 23 identifies a display in the driver's gaze direction from first display 11, second display 12, and third display 13.

Specifically, perception-based display processor 23 reads the attribute information items of first display 11, second display 12, and third display 13 from memory 26 to determine whether the driver's gaze point is on one of first display 11, second display 12, and third display 13. Here, the attribute information items indicate, for example, the positions inside an occupant compartment, the sizes, and the shapes of first display 11, second display 12, and third display 13. That is, perception-based display processor 23 compares the attribute information items and the driver's gaze identified by gaze identifier 22 or the position coordinates indicating the position of the driver's gaze point. In this way, perception-based display processor 23 determines whether the driver's gaze is directed at one of first display 11, second display 12, and third display 13.

In an example provided in the embodiment, the display in front of the steering wheel of vehicle 1 is set to third display 13, and when the driver's gaze is directed at third display 13, third display 13 displays guidance. The example illustrated in FIG. 1 is provided for purposes of illustration and not limitation. That is, depending on the driver's gaze, first display 11 and second display 12 in FIG. 1 may function as third display 13. In the embodiment, for explanatory convenience, the display in front of the steering wheel of vehicle 1 is set to third display 13. Depending on the driver's gaze, the display in front of the steering wheel of vehicle 1 can function as first display 11 or second display 12, and first display 11 or second display 12 can function as third display 13. The same applies to the figures subsequent to FIG. 1.

If it is known from the attribute information items and the gaze information that the driver's gaze is directed at one of first display 11, second display 12, and third display 13, that is, the driver's gaze point is on one of first display 11, second display 12, and third display 13, perception-based display processor 23 determines that the driver's gaze is directed at one of the displays. Perception-based display processor 23 identifies the display which the driver's gaze is directed at, as the display present in the driver's gaze direction and perceived by the driver. In this case, when the gaze identified by gaze identifier 22 is directed at a display displaying information, perception-based display processor 23 identifies the display as the display perceived by the driver.

In addition, as the result of determination obtained by identifying the display, perception-based display processor 23 outputs, to controller 27, information indicating the display which the driver's gaze is directed at or information indicating that the driver's gaze is directed at none of the displays.

Guidance display processor 24 identifies third display 13 as the one of the displays identified as a display which the driver's gaze is directed at among the displays and causes identified third display 13 to display guidance. Specifically, if the driver's gaze indicated by the gaze information output by gaze identifier 22 is directed at neither first display 11 nor second display 12, guidance display processor 24 causes third display 13 to display the guidance by performing guidance processing to guide the driver's gaze. Here, displaying of the guidance includes displaying of at least one sign for guiding the driver's gaze toward at least one display on which the first information is displayed after a change of the display position of the first information and displaying of at least one sign for guiding the driver's gaze toward at least one display on which the second information is displayed after a change of the display position of the second information. It should be noted that in display control system 2, since the driver of vehicle 1 faces forward, the display in front of the steering wheel may be set to third display 13.

Figure 3A:
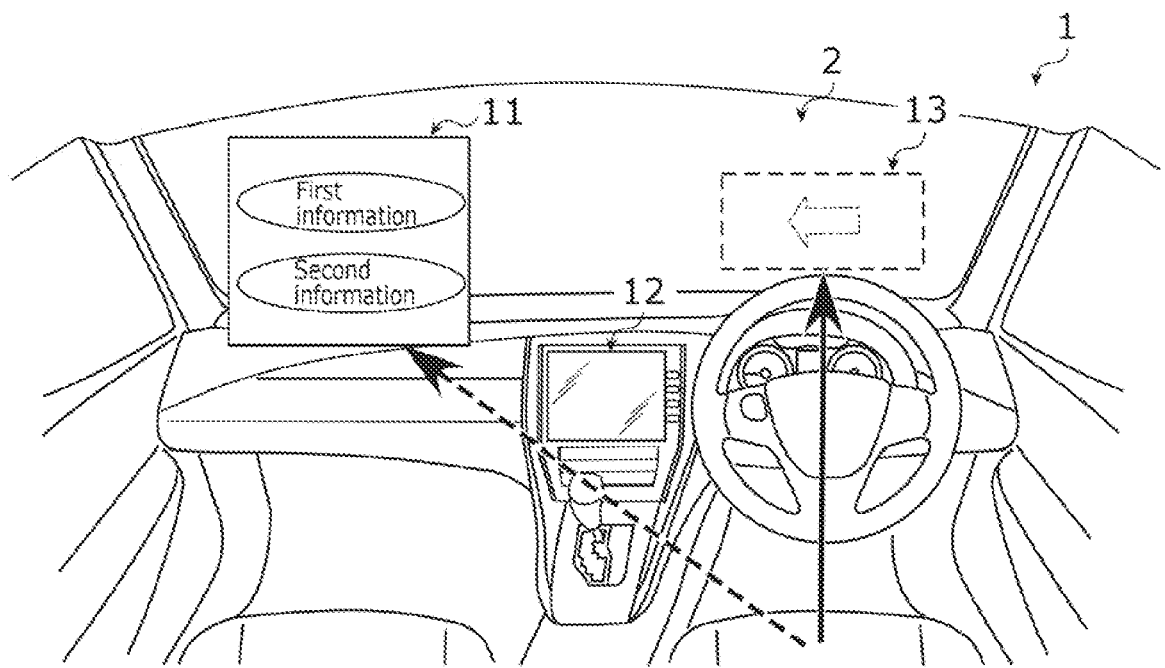
FIG. 3A illustrates a state in which displaying of guidance is stopped after a predetermined period has elapsed since the third display of the display control system according to the embodiment started displaying the guidance.

In addition, as illustrated in FIGS. 2 and 3A, if the driver's gaze is not directed at one or more displays pointed to by the displayed guidance even after a predetermined period has elapsed since third display 13 started displaying guidance, guidance display processor 24 may cause third display 13 to stop displaying the guidance. FIG. 3A illustrates a state in which displaying of the guidance is stopped after the predetermined period has elapsed since third display 13 of display control system 2 according to the embodiment started displaying the guidance. In FIG. 3A, the stop of displaying the guidance is indicated by the long dashed double-short dashed line. That is, there are cases in which the driver does not want to look at the first information and the second information displayed on first display 11 and/or second display 12. Thus, guidance display processor 24 removes the displayed guidance from third display 13 after the predetermined period has elapsed since third display 13 started displaying the guidance, which is less likely to cause annoyance to the driver due to the displayed guidance. In addition, in FIG. 3A, the driver's gaze directed at third display 13 is indicated by the continuous line, and the driver's gaze caused to be directed at first display 11 after the driver looks at third display 13 is indicated by the dashed line. The same applies to the subsequent figures.

As illustrated in FIGS. 1 and 2, display selector 25 selects at least one display from the displays as at least one display on which the first information and the second information will be displayed. Specifically, display selector 25 obtains information indicating displayed content from obtaining and processing unit 21. Then, when the display position of the first information is changed, display selector 25 selects, from first display 11 and second display 12, a display to be caused to display the first information. When the display position of the second information is changed, display selector 25 selects, from first display 11 and second display 12, a display to be caused to display the second information. Here, displaying the first information and the second information means displaying the first information and the second information on one display. In addition, in a case in which two displays each display the first information and the second information, first display 11 displays the first information and the second information, and second display 12 also displays the first information and the second information.

It should be noted that if one of first display 11 and second display 12 displays the first information and the second information, the other display may display the first information or the second information. In this case, guidance display processor 24 does not have to cause third display 13 to display guidance for guiding the driver's gaze toward the other display.

In addition, display selector 25 may set a display region for a display screen on the selected display. The position, size, shape, and other characteristics of the display region within the display screen are determined by display selector 25.

In addition, display selector 25 outputs information indicating the selected display to controller 27. Here, the information indicating the selected display is information such as an identifier used to identify the display selected by display selector 25.

Memory 26 pre-stores attribute information items, information items including the first information and the second information to be displayed on the displays, and guidance. In addition, memory 26 includes main memory such as random access memory (RAM) and read only memory (ROM). In addition, memory 26 may include secondary memory such as a hard disk drive (HDD) and a solid state drive (SSD) and tertiary memory (storage) such as an optical disk and an SD card.

Controller 27 controls first display 11 and second display 12 to control the displaying of the first information and the second information. Here, controller 27 changes the display position of the first information or the second information to display the first information or the second information on at least one display selected by display selector 25. That is, when obtaining information indicating the selected at least one display from display selector 25, controller 27 changes the display position of the first information or the second information to display the first information and the second information together on the at least one display indicated by the information indicating the selected at least one display. Accordingly, first display 11 and/or second display 12 display(s) the first information and the second information together. Here, controller 27 is an example of a computer.

Controller 27 obtains the gaze information, and the gaze indicated by the obtained gaze information is directed at neither first display 11 nor second display 12. In this situation, if the second event further occurs while first display 11 is displaying the first information because of the occurrence of the first event, controller 27 changes the display position of the second information to display the second information at least on first display 11. Controller 27 obtains the gaze information, and the gaze indicated by the obtained gaze information is directed at neither first display 11 nor second display 12. In this situation, if the first event further occurs while second display 12 is displaying the second information because of the occurrence of the second event, controller 27 changes the display position of the first information to display the first information at least on second display 12. Thus, if two events occur, controller 27 displays two information items corresponding to the two events together on one display.

Figure 3B:
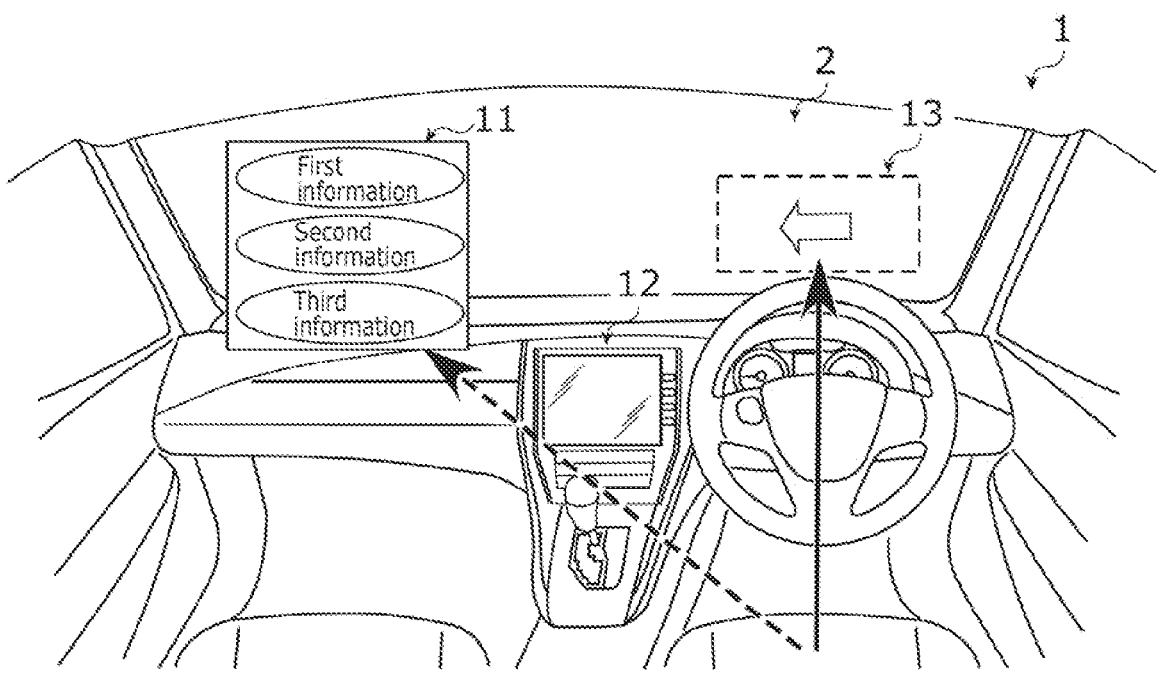
FIG. 3B illustrates a state in which the first display of the display control system according to the embodiment is displaying first information, second information, and third information.

The gaze indicated by the obtained gaze information is directed at neither first display 11 nor second display 12. In this situation, as illustrated in FIG. 3B, if a third event further occurs while first display 11 is displaying the first information and the second information because of the occurrence of the first event and the second event, controller 27 changes the display position of third information corresponding to the third event to display the third information on first display 11. The gaze indicated by the obtained gaze information is directed at neither first display 11 nor second display 12. In this situation, if the third event further occurs while second display 12 is displaying the first information and the second information because of the occurrence of the first event and the second event, controller 27 changes the display position of the third information corresponding to the third event to display the third information on second display 12. FIG. 3B illustrates a state in which first display 11 of display control system 2 according to the embodiment is displaying the first information, the second information, and the third information. Thus, if three events occur, controller 27 displays three information items corresponding to the three events all together on one display. The same applies to cases in which four or more events occur. It should be noted that FIG. 3B illustrates an example in which first display 11 is displaying the first information, the second information, and the third information all together. However, second display 12 and third display 13 may display the information items all together.

Figure 3C:
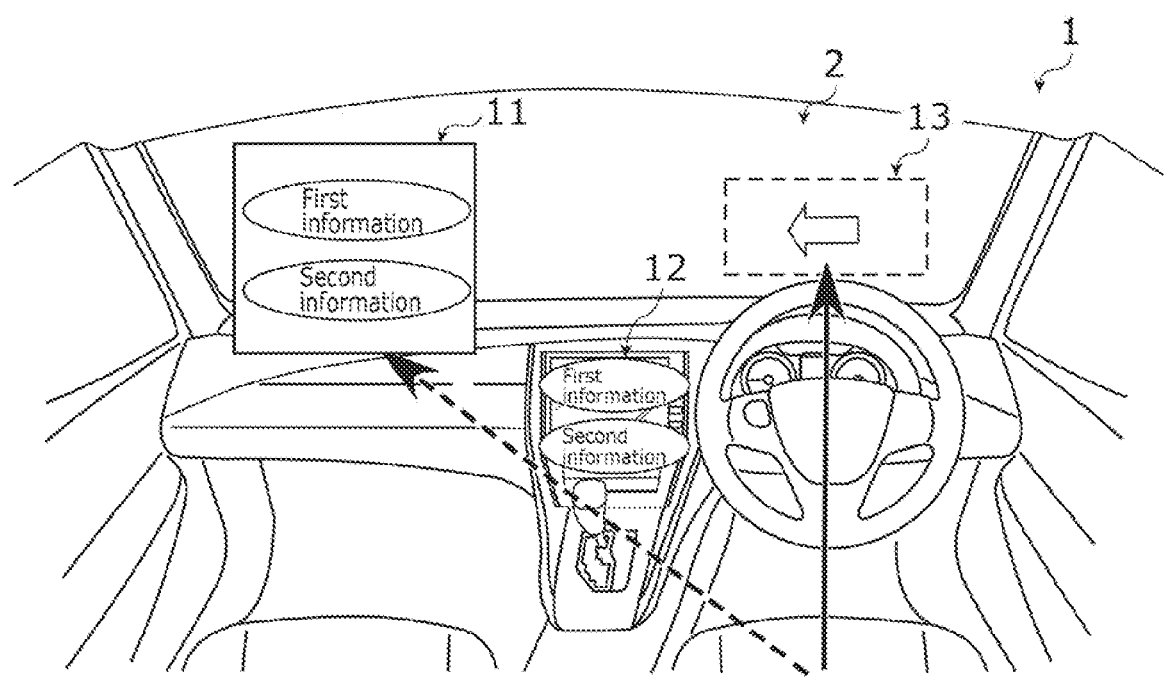
FIG. 3C illustrates a state in which the first display and the second display of the display control system according to the embodiment are each displaying the first information and the second information.

For instance, controller 27 changes the display position of the second information to display the second information at least on first display 11 and changes the display position of the first information to display the first information at least on second display 12. Thus, as illustrated in FIG. 3C, controller 27 may change the display position of the first information to display the first information on both of first display 11 and second display 12. In addition, controller 27 may change the display position of the second information to display the second information on both of first display 11 and second display 12. FIG. 3C illustrates a state in which first display 11 and second display 12 of display control system 2 according to the embodiment are each displaying the first information and the second information. For instance, if two events occur, controller 27 may cause all the displays to display two information items corresponding to the two events. In addition, if three or more events occur, controller 27 may cause all the displays to display three or more information items corresponding to the three or more events. Thus, all the displays display the same information items.

Processing Operations

Hereinafter, a processing operation performed by display control device 20, a processing operation performed by display control system 2, and a processing operation in the display control method in the embodiment are described.

Operation Example 1

Figure 4A:
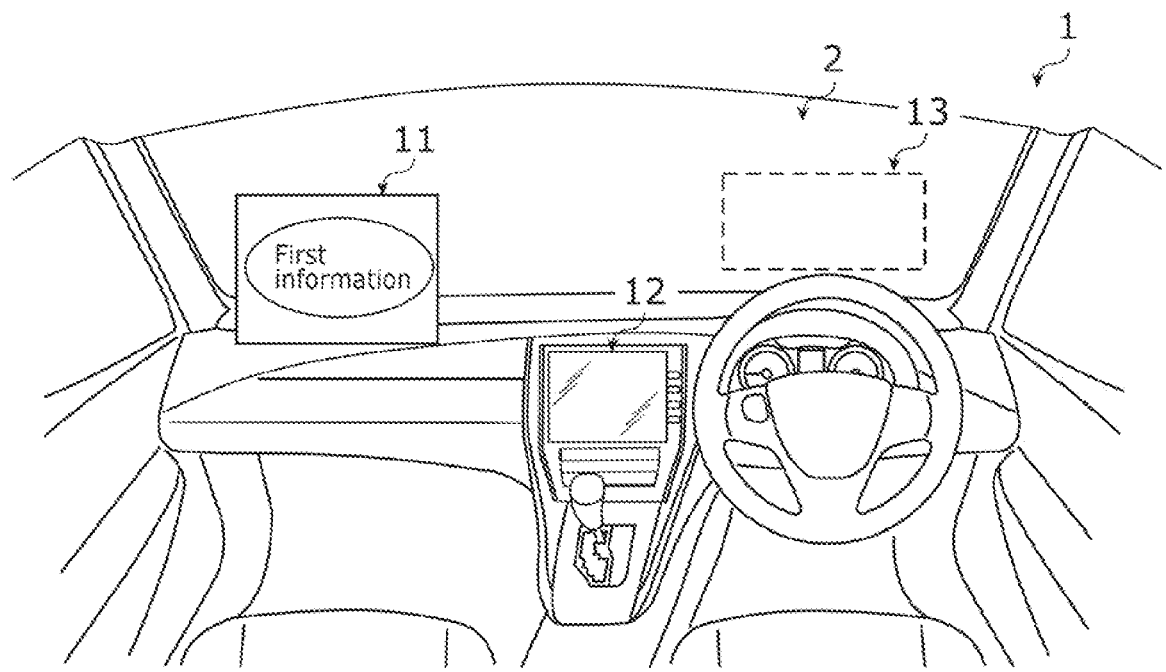
FIG. 4A illustrates a state in which the first display of the display control system according to the embodiment is displaying the first information.
Figure 4B:
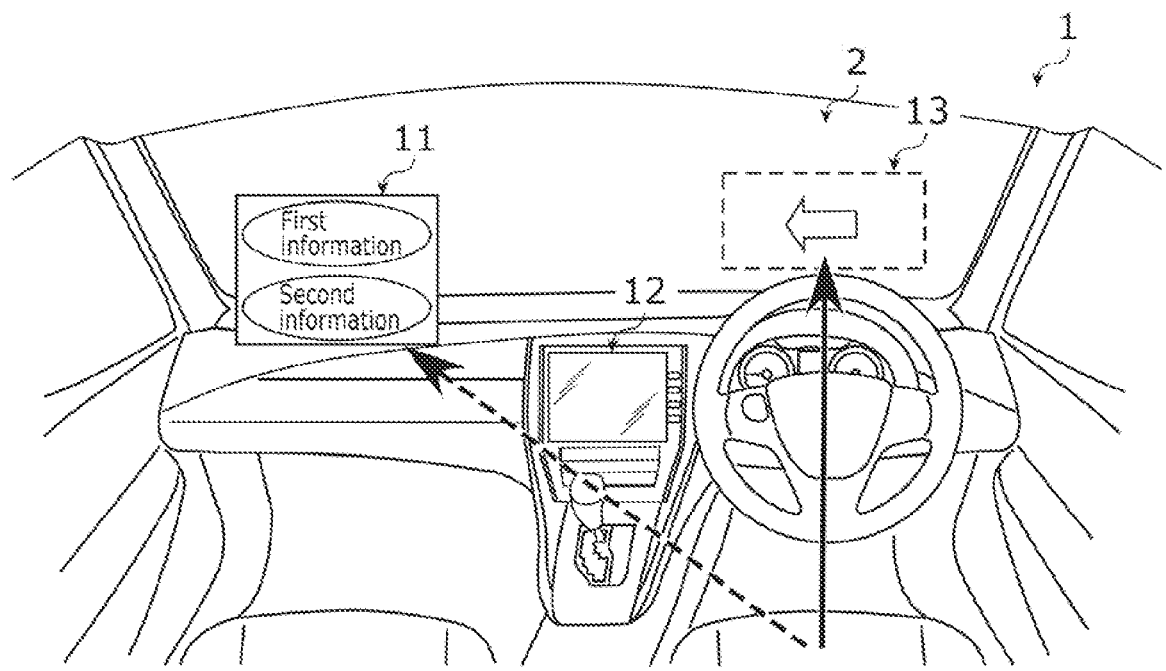
FIG. 4B illustrates a state in which the first display of the display control system according to the embodiment is displaying the first information and the second information.
Figure 5A:
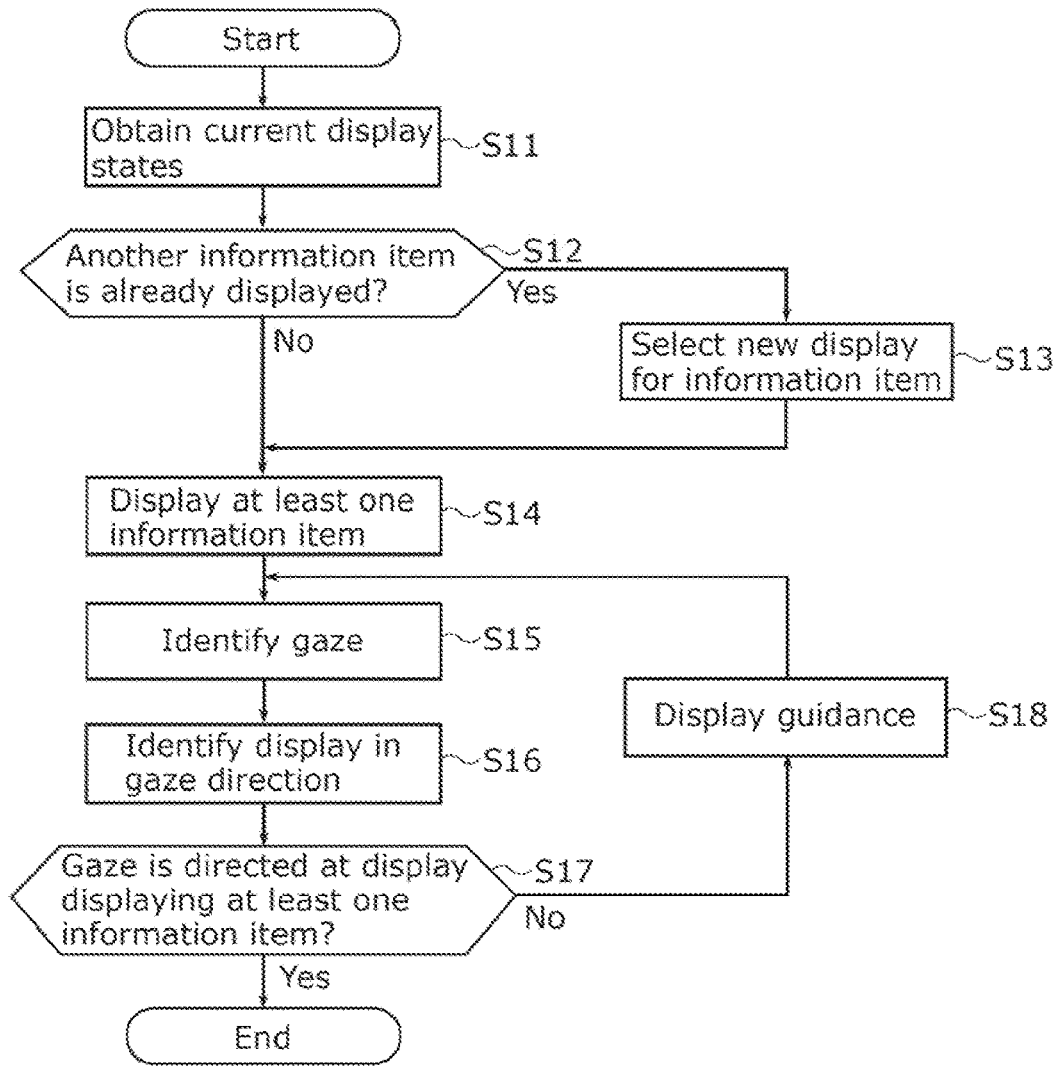
FIG. 5A is a flowchart illustrating a processing operation performed by the display control system according to the embodiment.

FIG. 4A illustrates a state in which first display 11 of display control system 2 according to the embodiment is displaying the first information. FIG. 4B illustrates a state in which first display 11 of display control system 2 according to the embodiment is displaying the first information and the second information. FIG. 5A is a flowchart illustrating a processing operation performed by display control system 2 according to the embodiment.

Display control system 2 performs a processing operation in a situation in which the second event further occurs while first display 11 is displaying the first information because of the occurrence of the first event. The processing operation performed by display control system 2 is described hereinafter. It should be noted that a similar processing operation is performed in a situation in which the first event further occurs while second display 12 is displaying the second information because of the occurrence of the second event. Thus, explanations are omitted.

First, as illustrated in FIG. 5A, obtaining and processing unit 21 obtains an information item indicating content displayed on first display 11 and an information item indicating content displayed on second display 12 (S11).

Next, according to the information items indicating the content displayed on first display 11 and the content displayed on second display 12, obtaining and processing unit 21 determines whether the first information is already displayed on at least one of first display 11 and second display 12 (S12). In the processing operation, as illustrated in FIG. 4A, a case in which the first information is already displayed on first display 11 is described as an example.

Then, if obtaining and processing unit 21 determines that at least one of first display 11 and second display 12 is displaying the first information (Yes in S12), display selector 25 selects a new display for an information item (S13). That is, display selector 25 selects, from first display 11 and second display 12, a display on which the second information will be displayed after the change of the display position of the second information. In the processing operation, as illustrated in FIG. 4A, since the first information is already displayed on first display 11, display selector 25 selects first display 11 as a new display for the second information, that is, a display to be caused to display the first information and the second information.

Then, as illustrated in FIGS. 4B and 5A, if obtaining and processing unit 21 determines that neither of the displays is displaying the first information (No in S12) or after performing step S13, controller 27 displays at least one information item (S14). Specifically, in the case of No in step S12, neither of the displays is displaying the first information. Thus, the display position of the second information is not changed, and the second information is displayed on second display 12, which is originally supposed to display the second information. Meanwhile, if step S13 is performed, since the first information is already displayed on first display 11, the second information is displayed together with the first information on first display 11.

Then, gaze identifier 22 extracts driver's eyeballs from at least one image of the driver taken by imaging unit 15 and identifies a driver's gaze from, for example, the movement and state of the extracted eyeballs (S15). Specifically, after identifying the driver's gaze, gaze identifier 22 identifies the position of a driver's gaze point from the identified gaze. In addition, gaze identifier 22 identifies the driver's gaze to output gaze information to, for example, controller 27 and guidance display processor 24.

Then, perception-based display processor 23 identifies a display in a driver's gaze direction from the attribute information items of first display 11 and second display 12 and the gaze information (S16). That is, if the driver's gaze point indicated by the gaze information is on one of first display 11 and second display 12, perception-based display processor 23 determines that the driver's gaze is directed at the display. Perception-based display processor 23 outputs, to controller 27, information indicating the display which the driver's gaze is directed at.

Then, controller 27 determines whether the driver's gaze is directed at the display displaying the at least one information item (S17). Specifically, in the case of No in step S12, controller 27 determines whether the display indicated by the information obtained from perception-based display processor 23, that is, the display which the driver's gaze is directed at is identical to second display 12 displaying the second information. Meanwhile, after step S13 is performed, controller 27 determines whether the display indicated by the information obtained from perception-based display processor 23, that is, the display which the driver's gaze is directed at is identical to first display 11 selected as the new display for the second information when the display position of the second information was changed.

If controller 27 determines that the driver's gaze is directed at the display displaying the at least one information item (Yes in S17), controller 27 ends the processing operation illustrated in the flowchart in FIG. 5A.

Meanwhile, if controller 27 determines that the driver's gaze is not directed at the display displaying the at least one information item (No in S17), guidance display processor 24 causes third display 13 to display guidance (S18). Thus, as the guidance, third display 13 displays a sign for guiding the driver's gaze. After step S18 is performed, the processing operation illustrated the flowchart in FIG. returns to step S15.

It should be noted that in the flowchart in FIG. 5A, if another event further occurs, display control system 2 may restart the processing from step S11.

Operation Example 2

Figure 5B:
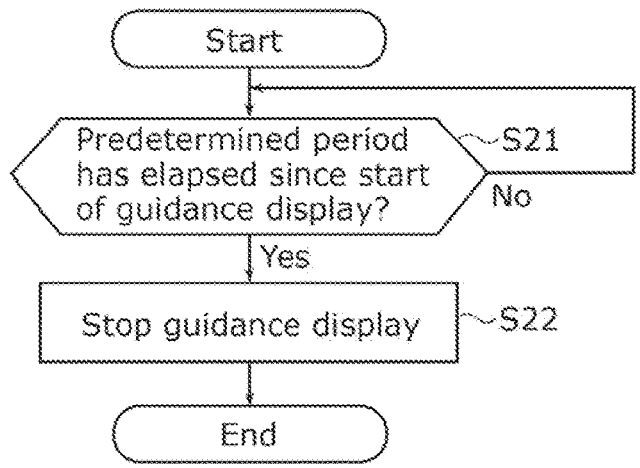
FIG. 5B is a flowchart illustrating another processing operation performed by the display control system according to the embodiment.

FIG. 5B is a flowchart illustrating another processing operation performed by display control system 2 according to the embodiment.

As illustrated in FIG. 5B, guidance display processor 24 determines whether a predetermined period has elapsed since third display 13 started displaying guidance (S21).

Then, if guidance display processor 24 determines that the predetermined period has not elapsed since third display 13 started displaying the guidance (No in S21), guidance display processor 24 repeats step S21.

Meanwhile, if guidance display processor 24 determines that the predetermined period has elapsed since third display 13 started displaying the guidance (Yes in S21), guidance display processor 24 causes third display 13 to stop displaying the guidance (S22).

Guidance display processor 24 ends the processing operation illustrated in the flowchart in FIG. 5B.

Advantageous Effects

Advantageous effects obtained from display control device 20, display control system 2, the display control method in the embodiment are described hereinafter.

In the information display system disclosed in PTL 1, when different information items are displayed on individual displays, a driver's gaze is guided toward the individual displays in order. In this case, a driver has to look at the individual displays. Thus, guidance may cause annoyance to the driver. As described above, display control device 20 according to the embodiment is used in vehicle 1 equipped with first display 11 and second display 12 and includes controller 27 that controls first display 11 and second display 12 to control the displaying of the first information and the second information. First display 11 displays the first information corresponding to the first event, and second display 12 displays the second information corresponding to the second event. Consider a situation in which controller 27 obtains gaze information indicating a driver's gaze and the driver's gaze indicated by the obtained gaze information is directed at neither first display 11 nor second display 12. In the situation, if the second event further occurs while first display 11 is displaying the first information because of the occurrence of the first event, controller 27 changes the display position of the second information to display the second information at least on first display 11. In the situation, if the first event further occurs while second display 12 is displaying the second information because of the occurrence of the second event, controller 27 changes the display position of the first information to display the first information at least on second display 12.

For instance, the conventional technique has the following issues. When a vehicle is backed into a parking position, a display may display an image of objects in a blind spot behind the vehicle, and another display may display an image of a side of the vehicle. When the vehicle runs on an expressway, a display may display a guidance image regarding a fork or a junction, and another display may display a warning image when the vehicle exceeds the speed limit. When the vehicle turns right, there may be a case in which while another traveling object is approaching the vehicle from the right, still another traveling object approaches the vehicle from the left. In this case, in the conventional technique, a display displays an image of another traveling object approaching the vehicle from the right, and guidance is displayed to guide the driver's gaze toward the display. Then, another display displays an image of still another traveling object approaching the vehicle from the left, and guidance is displayed to guide the driver's gaze toward another display. That is, the driver has to look at the display after looking at the displayed guidance and then look at another display after looking at the displayed guidance, which may cause annoyance to the driver.

However, in the embodiment, for instance, if another event occurs while a display is displaying an information item because of the occurrence of an event, it is possible to change the display position of another information item corresponding to another event so that another information item is displayed on the display on which the information item is already displayed. That is, display control device 20 can display two information items on one display. Thus, in the embodiment, the driver just has to look at a display displaying two information items, which causes less annoyance to the driver in comparison to a case in which two information items are separately displayed on different displays as in the case of conventional technique.

Accordingly, in display control device 20, it is possible to suppress annoyance caused to the driver when the driver looks at the displays.

In addition, display control system 2 according to the embodiment includes first display 11, second display 12, and display control device 20 that controls displaying by first display 11 and second display 12.

Advantageous effects similar to those described above can be obtained also in display control system 2.

In addition, the display control method according the embodiment is used in vehicle 1 equipped with first display 11 and second display 12. First display 11 displays the first information corresponding to the first event, and second display 12 displays the second information corresponding to the second event. A computer controls first display 11 and second display 12 to control the displaying of the first information and the second information. Consider a situation in which the computer obtains gaze information indicating a driver's gaze and the driver's gaze indicated by the obtained gaze information is directed at neither first display 11 nor second display 12. In the situation, if the second event further occurs while first display 11 is displaying the first information because of the occurrence of the first event, the computer changes the display position of the second information to display the second information at least on first display 11. In the situation, if the first event further occurs while second display 12 is displaying the second information because of the occurrence of the second event, the computer changes the display position of the first information to display the first information at least on second display 12.

Advantageous effects similar to those described above can be obtained also in the display control method.

In addition, in display control device 20 according to the embodiment, vehicle 1 is equipped with displays including first display 11 and second display 12. Display control device 20 further includes gaze identifier 22, perception-based display processor 23, and guidance display processor 24. Gaze identifier 22 identifies a driver's gaze to output gaze information. Perception-based display processor 23 determines that the driver's gaze indicated by the gaze information output by gaze identifier 22 is directed at one of the displays. Guidance display processor 24 identifies third display 13 as the one of the displays identified as a display which the driver's gaze is directed at among the displays and causes identified third display 13 to display guidance. Displaying of the guidance includes displaying of at least one sign for guiding the driver's gaze toward at least one display on which the first information is displayed after the change of the display position of the first information and displaying at least one sign for guiding the driver's gaze toward at least one display on which the second information is displayed after the change of the display position of the second information.

Thus, by identifying the driver's gaze, it is possible to display the guidance on the display present in the driver's gaze direction. This enables the driver to notice the displayed guidance, which enables the driver to look at one or more displays pointed to by the displayed guidance and perceive the first information and the second information displayed on the one or more displays, together.

In addition, in display control device 20 according to the embodiment, if the driver's gaze indicated by the gaze information output by gaze identifier 22 is directed at neither first display 11 nor second display 12, guidance display processor 24 causes third display 13 to display guidance.

In this way, if the driver's gaze is not directed at first display 11 or second display 12, guidance display processor 24 can cause third display 13 to display the guidance. Thus, by moving the gaze according to the guidance displayed on third display 13, the driver can look at one or more displays pointed to by the displayed guidance. Accordingly, the driver can look at the first information and the second information displayed on the one or more displays, which enables the driver to perceive the first information and the second information together.

In addition, in display control device 20 according to the embodiment, if the driver's gaze is not directed at one or more displays pointed to by the displayed guidance even after a predetermined period has elapsed since third display 13 started displaying the guidance, guidance display processor 24 causes third display 13 to stop displaying the guidance.

Since there are cases in which the driver does not want to look at information displayed on the one or more displays, by stopping displaying the guidance after the elapse of the predetermined period, it is possible to suppress annoyance caused to the driver due to the displayed guidance. In addition, since the displayed guidance is removed from third display 13, the driver is less distracted from driving and can maintain safe driving of vehicle 1.

In addition, display control device 20 according to the embodiment includes display selector 25. When the display position of the first information is changed, display selector 25 selects, from first display 11 and second display 12, at least one display to be caused to display the first information. When the display position of the second information is changed, display selector 25 selects, from first display 11 and second display 12, at least one display to be caused to display the second information. Controller 27 causes the at least one display selected by display selector 25 to display the first information and the second information.

In this manner, it is possible to select the at least one display on which the first information will be displayed after the change of the display position of the first information and the at least one display on which the second information will be displayed after the change of the display position of the second information. Thus, the first information and the second information can be displayed on a display located at the position which is easy for the driver to look at in terms of the driver's gaze. Thus, it is possible to improve driver's visibility of the first information and the second information.

In addition, in display control device 20 according to the embodiment, consider a situation in which the driver's gaze indicated by the obtained gaze information is directed at neither first display 11 nor second display 12. In the situation, if the third event further occurs while first display 11 is displaying the first information and the second information because of the occurrence of the first event and the second event, controller 27 changes the display position of the third information corresponding to the third event to display the third information on first display 11. In the situation, if the third event further occurs while second display 12 is displaying the first information and the second information because of the occurrence of the first event and the second event, controller 27 changes the display position of the third information corresponding to the third event to display the third information on second display 12.

In this way, if the third event different from the first and second events occurs, the third information can be displayed together with the first information and the second information on a predetermined display. That is, display control device 20 can display three information items all together on one display. Thus, the driver just has to look at the display displaying three information items all together, which causes less annoyance to the driver.

In addition, in display control device 20 according to the embodiment, controller 27 changes the display position of the first information to display the first information on both of first display 11 and second display 12. Controller 27 changes the display position of the second information to display the second information on both of first display 11 and second display 12.

In this way, the displays with which vehicle 1 is equipped can each display the first information and the second information. That is, the displays display the same information items. This can improve the driver's visibility of the first information and the second information. In addition, it is possible to improve the visibility of the first information and the second information for passengers in vehicle 1.

Variation 1 of Embodiment

Display control device 20, display control system 2, and a display control method according to Variation 1 are described with reference to FIGS. 6A and 6B.

Figure 6A:
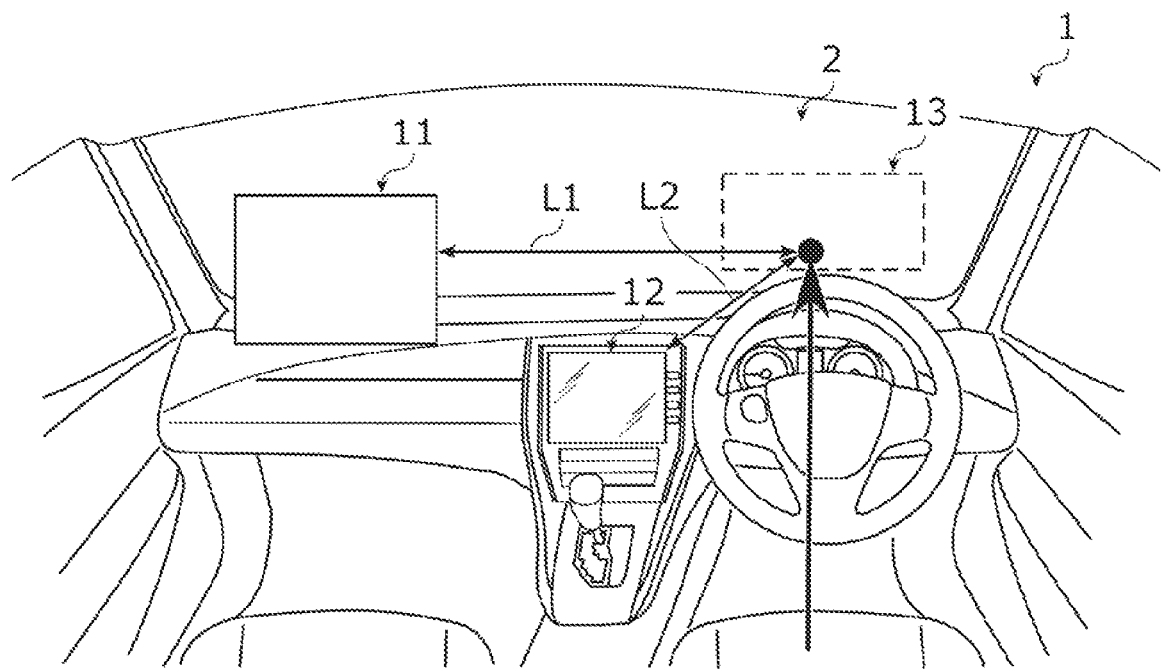
FIG. 6A illustrates the distance between the first display and third display of a display control system according to Variation 1 of the embodiment and the distance between the second display and third display of the display control system.
Figure 6B:
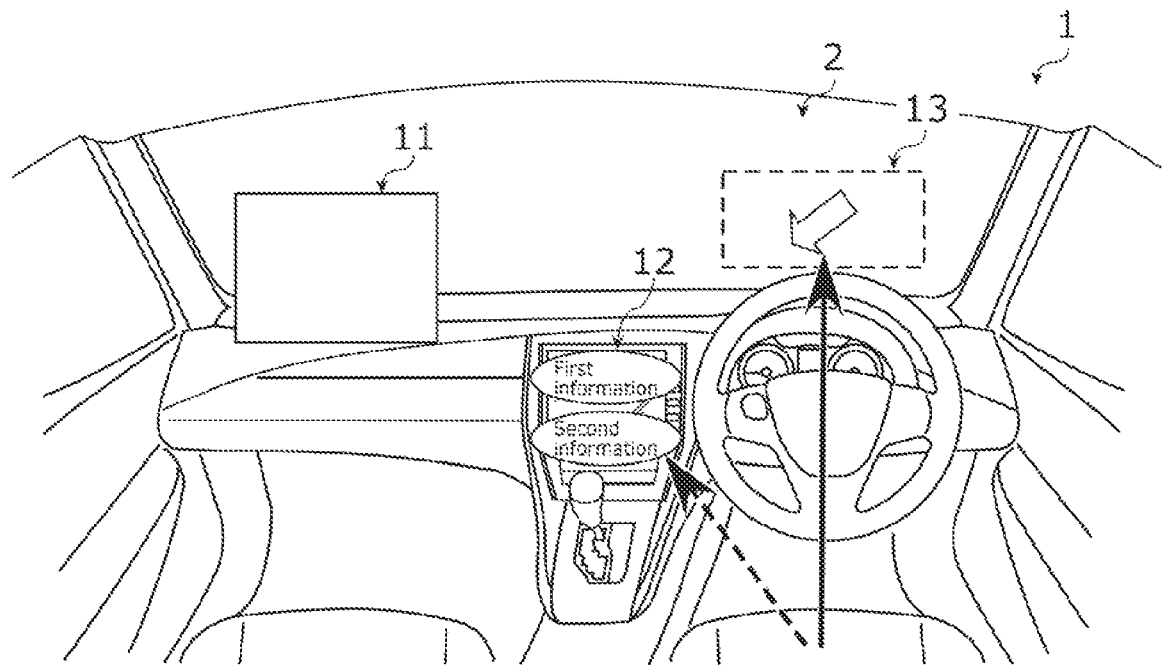
FIG. 6B illustrates a state in which the second display of the display control system according to Variation 1 of the embodiment is displaying the first information and the second information.

FIG. 6A illustrates distance L1 between first display 11 and third display 13 and distance L2 between second display 12 and third display 13, first display 11, second display 12, and third display 13 being included in display control system 2 according to Variation 1 of the embodiment. FIG. 6B illustrates a state in which second display 12 of display control system 2 according to Variation 1 of the embodiment is displaying first information and second information.

In display control device 20, display control system 2, and the display control method in Variation 1, it is possible to display the first information and the second information on the display closest to the position of a gaze point based on a driver's gaze. In this respect, display control device 20, display control system 2, and the display control method in Variation 1 differ from those in the embodiment. The reference symbols assigned to the elements and functions of display control device 20, display control system 2, and the display control method in the embodiment are assigned to the corresponding elements and functions of display control device 20, display control system 2, and the display control method in Variation 1. Detailed explanations for the elements and functions are omitted.

As illustrated in FIG. 6A, display selector 25 in Variation 1 identifies, from first display 11 and second display 12, a display closer to the position of a gaze point based on a gaze indicated by gaze information output by gaze identifier 22 and selects the identified display. Gaze identifier 22 in Variation 1 identifies the driver's gaze to output the gaze information to controller 27 and display selector 25.

Specifically, display selector 25 identifies the display closest to the position of the gaze point based on the gaze from attribute information items and the gaze information and selects the identified display. More specifically, display selector 25 reads the attribute information items of first display 11 and second display 12 stored in memory 26. Then, display selector 25 compares the positions of first display 11 and second display 12 in an occupant compartment indicated by the attribute information items and the position of the driver's gaze point indicated by the gaze information output by gaze identifier 22. In this manner, display selector 25 identifies the display closest to the position of the gaze point based on the gaze indicated by the gaze information output by gaze identifier 22 and selects the identified display. In Variation 1, display selector 25 calculates distance L1 between first display 11 and third display 13 and distance L2 between second display 12 and third display 13. Since second display 12 is closer to third display 13 than first display 11 is, display selector 25 selects second display 12.

In addition, controller 27 displays the first information and the second information together on the display closest to the position of the gaze point based on the gaze that was selected by display selector 25. Specifically, when obtaining information indicating the selected display from display selector 25, controller 27 displays the first information and the second information together on the display closest to the driver's gaze point that is indicated by the information indicating the selected display. Thus, the first information and the second information are displayed together on first display 11 and/or second display 12. In Variation 1, as illustrated in FIG. 6B, second display 12 selected by display selector 25 displays the first information and the second information together.

In display control device 20 according to Variation 1, display selector 25 identifies, from first display 11 and second display 12, a display closer to the position of the gaze point based on the gaze indicated by the gaze information output by gaze identifier 22 and selects the identified display. Then, controller 27 displays the first information and the second information on the display closer to the position of the gaze point based on the gaze that was selected by display selector 25.

In this manner, it is possible to display the first information and the second information on the display closest to the position of the gaze point based on the driver's gaze. This can suppress the amount of driver's gaze movement from increasing. This makes it easier for the driver to look at the first information and the second information together, which can suppress annoyance caused to the driver when the driver looks at displays.

Variation 2 of Embodiment

Display control device 20, display control system 2, and a display control method according to Variation 2 are described with reference to FIGS. 7A to 7D.

Figure 7A:
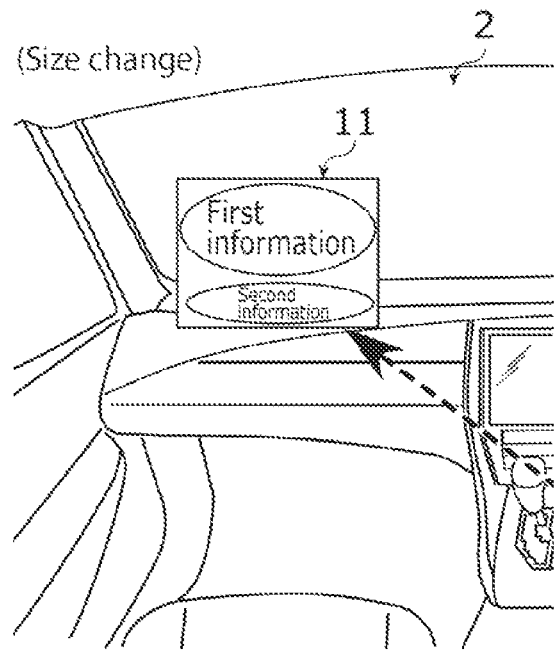
FIG. 7A illustrates a state in which the display size of first information is larger than that of second information, the first information and the second information being displayed on the first display of a display control system according to Variation 2 of the embodiment.
Figure 7B:
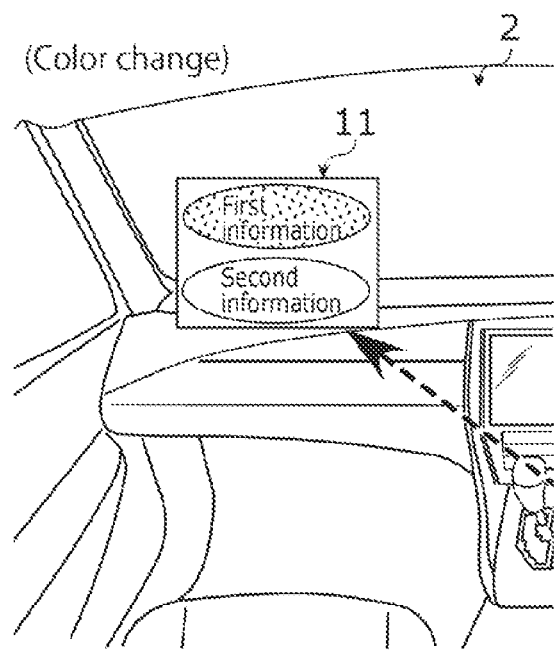
FIG. 7B illustrates a state in which the first display of the display control system according to Variation 2 of the embodiment is displaying the first information in a color different from an original color.
Figure 7C:
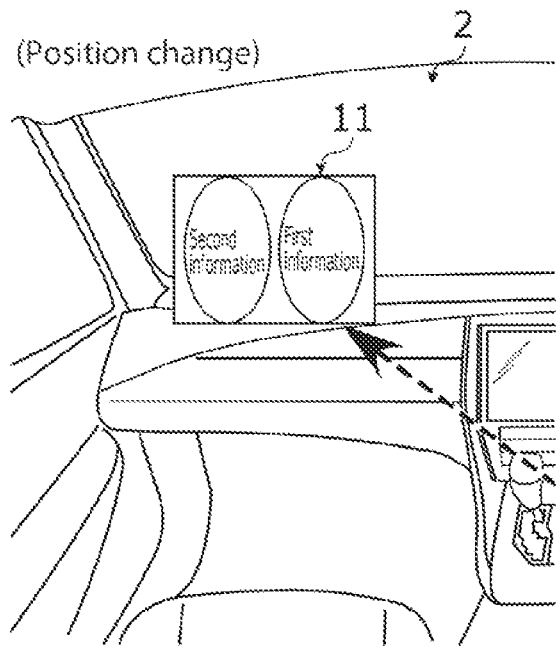
FIG. 7C illustrates a state in which the first display of the display control system according to Variation 2 of the embodiment is displaying the first information and the second information at positions different from original positions.
Figure 7D:
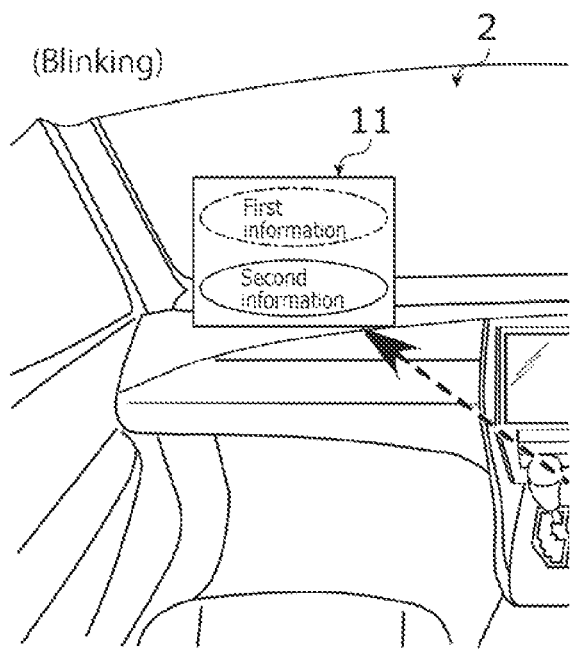
FIG. 7D illustrates a state in which the first display of the display control system according to Variation 2 of the embodiment is displaying the blinking first information.

FIG. 7A illustrates a state in which the display size of first information is larger than that of second information, the first information and the second information being displayed on first display 11 of display control system 2 according to Variation 2 of the embodiment. FIG. 7B illustrates a state in which first display 11 of display control system 2 according to Variation 2 of the embodiment is displaying the first information in a color different from an original color. FIG. 7C illustrates a state in which first display 11 of display control system 2 according to Variation 2 of the embodiment is displaying the first information and the second information at positions different from original positions. FIG. 7D illustrates a state in which first display 11 of display control system 2 according to Variation 2 of the embodiment is displaying the blinking first information. It should be noted that FIGS. 7A, 7B, and 7D illustrate examples in which the display state of the first information has been changed. However, the display state of the second information may be changed. In FIG. 7D, the blinking first information is indicated by the long dashed short dashed line.

In display control device 20, display control system 2, and the display control method according to Variation 2, it is possible to display the first information and the second information in a display state different from an original display state. In this respect, display control device 20, display control system 2, and the control method in Variation 2 differ from those in the embodiment. The reference symbols assigned to the elements and functions of display control device 20, display control system 2, and the display control method in the embodiment are assigned to the corresponding elements and functions of display control device 20, display control system 2, and the display control method in Variation 2. Detailed explanations for the elements and functions are omitted.

If the level of importance set to the first information is greater than or equal to a first value, controller 27 changes the display state of the first information and causes a display selected by display selector 25 to display the first information whose display state has been changed and the second information, together. In addition, if the level of importance set to the second information is greater than or equal to the first value, controller 27 changes the display state of the second information and causes the display selected by display selector 25 to display the first information and the second information whose display state has been changed, together. Here, displaying the first information in a changed display state and displaying the second information in a changed display state include displaying in an enlarged size, displaying in a color different from an original color, displaying at a position different from an original position, and displaying in a blinking state. In this manner, if the level of importance of information is greater than or equal to the first value, the display displays the information in an enlarged size, in a color different from an original color, at a position different from an original position, or in a blinking state. In addition, the levels of importance are preset values and are stored in memory 26. A high level of importance may be set to information related to the safety of occupants in a vehicle. In addition, the first value is also a preset value. The information related to the safety includes, for example, the existence of at least one traveling object approaching vehicle 1 and the existence of at least one person around vehicle 1. In addition, information having a low level of importance includes, for example, information indicating, for example, the remaining amount of gasoline.

In addition, FIG. 7C illustrates an example in which the level of importance of the first information is higher than that of the second information. The display position of the first information is closer to the driver than the display position of the second information is. This can improve the driver's visibility of information having a higher level of importance.

In display control device 20 according to Variation 2, if the level of importance set to the first information is greater than or equal to the first value, controller 27 changes the display state of the first information and causes the display selected by display selector to display the first information whose display state has been changed and the second information. If the level of importance set to the second information is greater than or equal to the first value, controller 27 changes the display state of the second information and causes the display selected by display selector 25 to display the first information and the second information whose display state has been changed.

Thus, if the level of importance of information is greater than or equal to the first value, the level of importance of the information is high. Thus, it is possible to change the display state of the information having a high level of importance. This improves the driver's visibility of the information having the high level of importance.

In display control device 20 according to Variation 2, displaying the first information in a changed display state and displaying the second information in a changed display state include displaying in an enlarged size, displaying in a color different from an origin& color, displaying at a position different from an original position, and displaying in a blinking state.

Thus, information having a high level of importance is emphasized, which improves the driver's visibility of the information having the high level of importance.

Variation 3 of Embodiment

Display control device 20, display control system 2, and a display control method according to Variation 3 are described with reference to FIG. 8.

Figure 8:
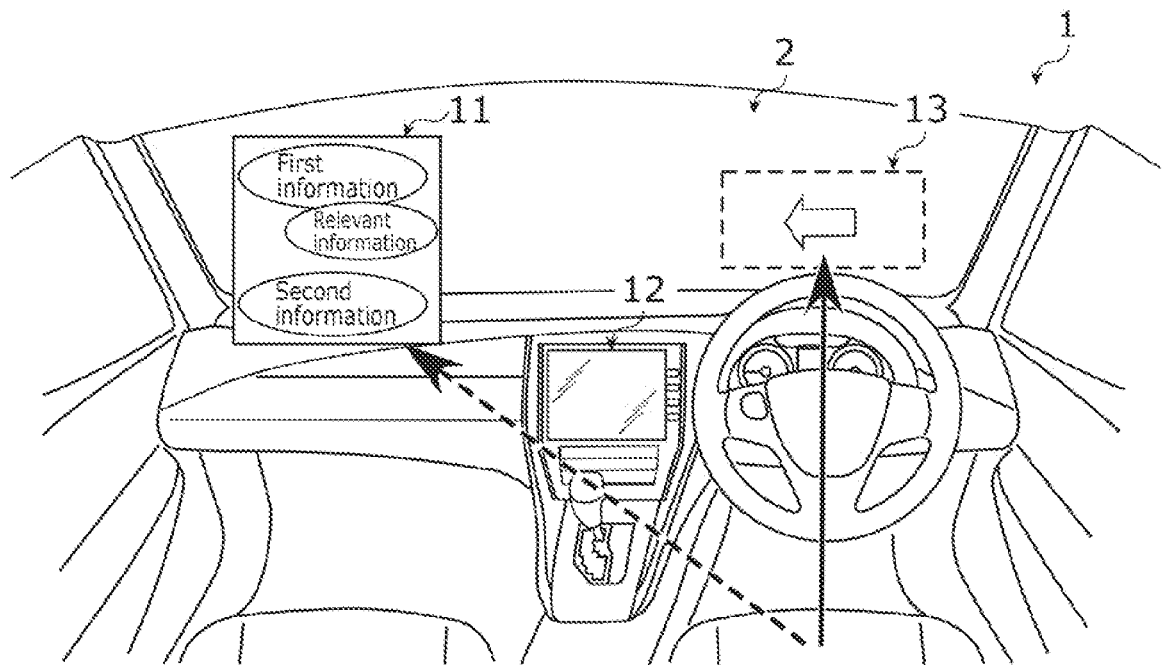
FIG. 8 illustrates a state in which the first display of a display control system according to Variation 3 of the embodiment is displaying first information, second information, and relevant information of the first information.

FIG. 8 illustrates a state in which first display 11 of display control system 2 according to Variation 3 of the embodiment is displaying first information, second information, and the relevant information of the first information. It should be noted that in FIG. 8, the relevant information of the first information is illustrated for purposes of illustration and not limitation. For instance, first display 11 may display the relevant information of the second information.

In display control device 20, display control system 2, and the display control method according to Variation 3, it is possible to change the display position of at least one information item and display, on a display, the first information, the second information, and information related to information having a high level of importance. In this respect, display control device 20, display control system 2, and the display control method according to Variation 3 differ from those in the embodiment. The reference symbols assigned to the elements and functions of display control device 20, display control system 2, and the display control method in the embodiment are assigned to the corresponding elements and functions of display control device 20, display control system 2, and the display control method in Variation 3. Detailed explanations for the elements and functions are omitted.

Controller 27 extracts information having a high level of importance on the basis of the levels of importance set to the first information and the second information. Specifically, on the basis of the levels of importance set to the first information and the second information, controller 27 extracts, from the first information and the second information, at least one information item having a level of importance greater than or equal to a second value. In addition, controller 27 causes a display selected by display selector 25 to display the first information, the second information, and at least one relevant information item related to the extracted at least one information item having the level of importance greater than or equal to the second value. That is, when a first event and a second event occur, if for instance the level of importance of the first information is greater than or equal to the second value, controller 27 adds a relevant information item to the first information having a high level of importance (the first information will be displayed in association with the relevant information item) and causes the display to display the relevant information item, the first information, and the second information. It should be noted that FIG. 8 illustrates an example in which the level of importance of the first information is greater than or equal to the second value. However, a relevant information item may be added to the second information, and relevant information items may be added to the first information and the second information. Thus, a relevant information item is added only to an information item having a level of importance greater than or equal to the second value and displayed by the display. In addition, the second value is a preset value.

In display control device 20 according to Variation 3, on the basis of the levels of importance set to the first information and the second information, controller 27 extracts at least one information item having a level of importance greater than or equal to the second value and causes the display selected by display selector 25 to display the first information, the second information, and at least one relevant information item related to the extracted at least one information item having the level of importance greater than or equal to the second value.

If the level of importance of information is greater than or equal to the second value, the level of importance of the information is high. Thus, it is possible to display the relevant information of the information together with the first information and the second information on a predetermined display. This enables a driver to look at the information having a high level of importance and the relevant information of the information.

Variation 4 of Embodiment

Figure 9:
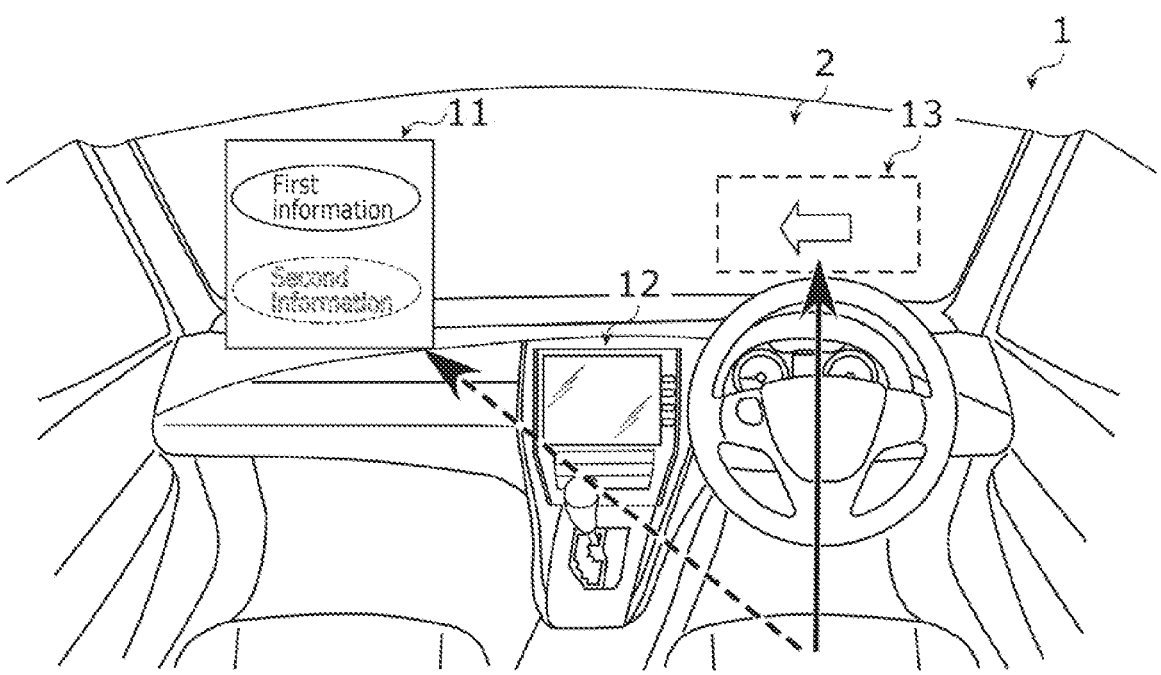
FIG. 9 illustrates a state in which second information having a decreased level of importance is removed, the second information having been displayed together with first information on the first display of a display control system according to Variation 4 of the embodiment.

Display control device 20, display control system 2, and the display control method according to Variation 4 are described with reference to FIG. 9, FIG. 9 illustrates a state in which second information having a decreased level of importance is removed, the second information having been displayed together with first information on first display 11 of display control system 2 according to Variation 4 of the embodiment. In FIG. 9, the removed second information is illustrated by the long dashed double-short dashed line and the dotted hatching.

In display control device 20, display control system 2, and the display control method according to Variation 4, information having a decreased level of importance can be removed from a display. In this respect, display control device 20, display control system 2, and the display control method according to Variation 4 differ from those in the embodiment. The reference symbols assigned to the elements and functions of display control device 20, display control system 2, and the display control method in the embodiment are assigned to the corresponding elements and functions of display control device 20, display control system 2, and the display control method in Variation 4. Detailed explanations for the elements and functions are omitted. The information having the decreased level of importance is information notifying that, for example, a traveling object which approached vehicle 1 is moving away from vehicle 1.

On the basis of the levels of importance set to the first information and the second information, controller 27 extracts, from the first information and the second information, at least one information item having a level of importance less than a second value. In addition, controller 27 removes, from a display, the extracted at least one information having the level of importance less than the second value. That is, when a first event and a second event occur, controller 27 changes the display position of an information item and causes a display to display the first information and the second information. For instance, if the level of importance of at least one of the first information and the second information has decreased to a value less than the second value, controller 27 removes, from the display, the at least one information item whose level of importance has decreased to the value less than the second value. Thus, the display displays only the information having a level of importance greater than or equal to the second value. FIG. 9 illustrates an example in which the second information is removed from first display 11. If the level of importance of the first information is decreased to a value less than the second value, the first information may be removed from first display 11.

In display control device 20 according to Variation 4, on the basis of the levels of importance set to the first information and the second information, controller 27 extracts at least one information item having a level of importance less than the second value from the first information and the second information and removes, from the display, the extracted at least one information item having the level of importance less than the second value.

Thus, the information having a decreased level of importance can be removed from the display. This enables the display to display only the information having a level of importance greater than or equal to the second value. This makes it easier for a driver to exclusively look at the information having a high level of importance.

Variation 5 of Embodiment

Display control device 20, display control system 2, and a display control method according to Variation 5 are described with reference to FIG. 10.

Figure 10:
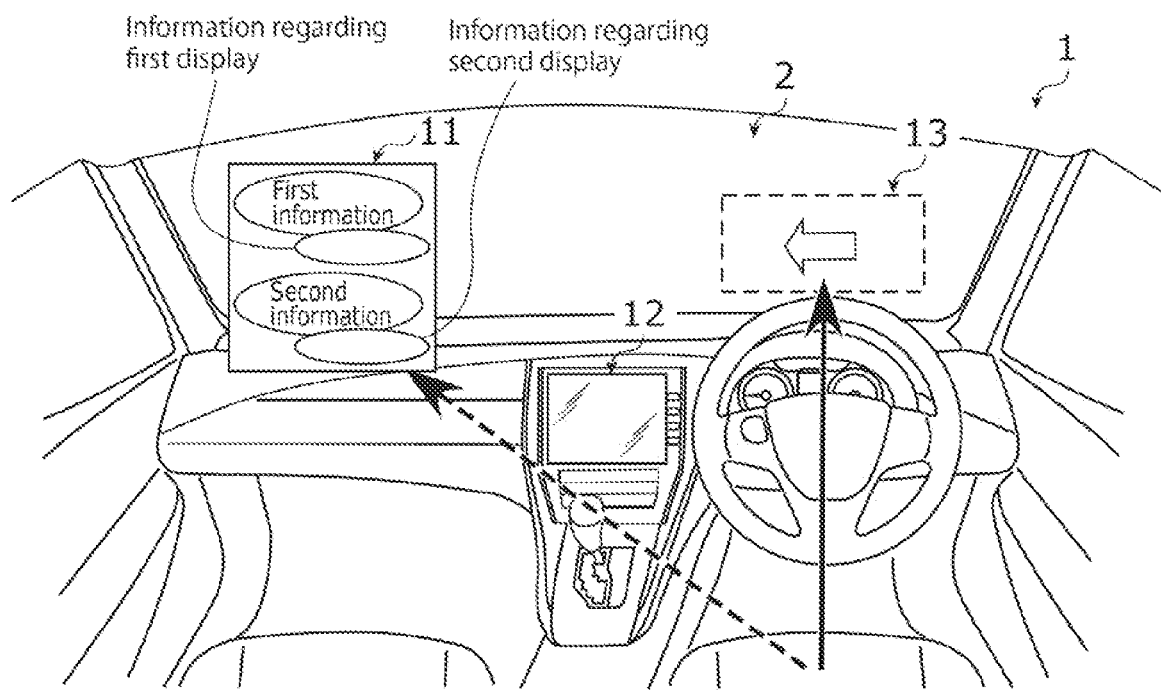
FIG. 10 illustrates a state in which the first display of a display control system according to Variation 5 of the embodiment is displaying first information, second information, information regarding the first display, and information regarding the second display.

FIG. 10 illustrates a state in which first display 11 of display control system 2 according to Variation 5 of the embodiment is displaying first information, second information, information regarding first display 11, and information regarding second display 12.

In display control device 20, display control system 2, and the display control method according to Variation 5, the information regarding first display 11 and the information regarding second display 12 can be displayed together with the first information and the second information. In this respect, display control device 20, display control system 2, and the display control method according to Variation 5 differ from those in the embodiment. The reference symbols assigned to the elements and functions of display control device 20, display control system 2, and the display control method in the embodiment are assigned to the corresponding elements and functions of display control device 20, display control system 2, and the display control method in Variation 5. Detailed explanations for the elements and functions are omitted.

When controller 27 changes the display position of an information item and causes first display 11 to display the first information and the second information, controller 27 causes first display 11 to display the information regarding first display 11 and the information regarding second display 12 together with the first information and the second information. When controller 27 changes the display position of an information item and causes second display 12 to display the first information and the second information, controller 27 causes second display 12 to display the information regarding first display 11 and the information regarding second display 12 together with the first information and the second information. For instance, when a first event and a second event occur, controller 27 causes a display to display the first information and the second information. At this time, controller 27 causes the display to also display the information regarding first display 11 originally supposed to display the first information and the information regarding second display 12 originally supposed to display the second information. That is, controller 27 displays the first information to which the information regarding first display 11 is added (the first information is displayed in association with the information regarding first display 11) and the second information to which the information regarding second display 12 is added, together on one display.

In display control device 20 according to Variation 5, after changing the display position of the second information to display the second information on first display 11, controller 27 causes first display 11 to display the information regarding first display 11, the information regarding second display 12, the first information, and the second information. Likewise, after changing the display position of the first information to display the first information on second display 12, controller 27 causes second display 12 to display the information regarding first display 11, the information regarding second display 12, the first information, and the second information.

Drivers are usually aware of differences between information items displayed on respective displays according to the positions of the displays provided in an occupant compartment. If for instance a vehicle is equipped with a left display, which is disposed in the left part of the vehicle, and a right display, which is disposed in the right part of the vehicle, drivers presumably intuitively understand that information regarding the left side of the vehicle is displayed on the left display and that information regarding the right side of the vehicle is displayed on the right display.

Thus, in display control device 20 according to Variation 5, displaying of the information regarding first display 11, the information regarding second display 12, and the first information, and the second information enables a driver to understand that the first information relates to first display 11 and that the second information relates to second display 12. Accordingly, the driver can understand the first information and the second information more accurately.

Variation 6 of Embodiment

Display control device 20, display control system 2, and a display control method according to Variation 6 are described with reference to FIG. 11.

Figure 11:
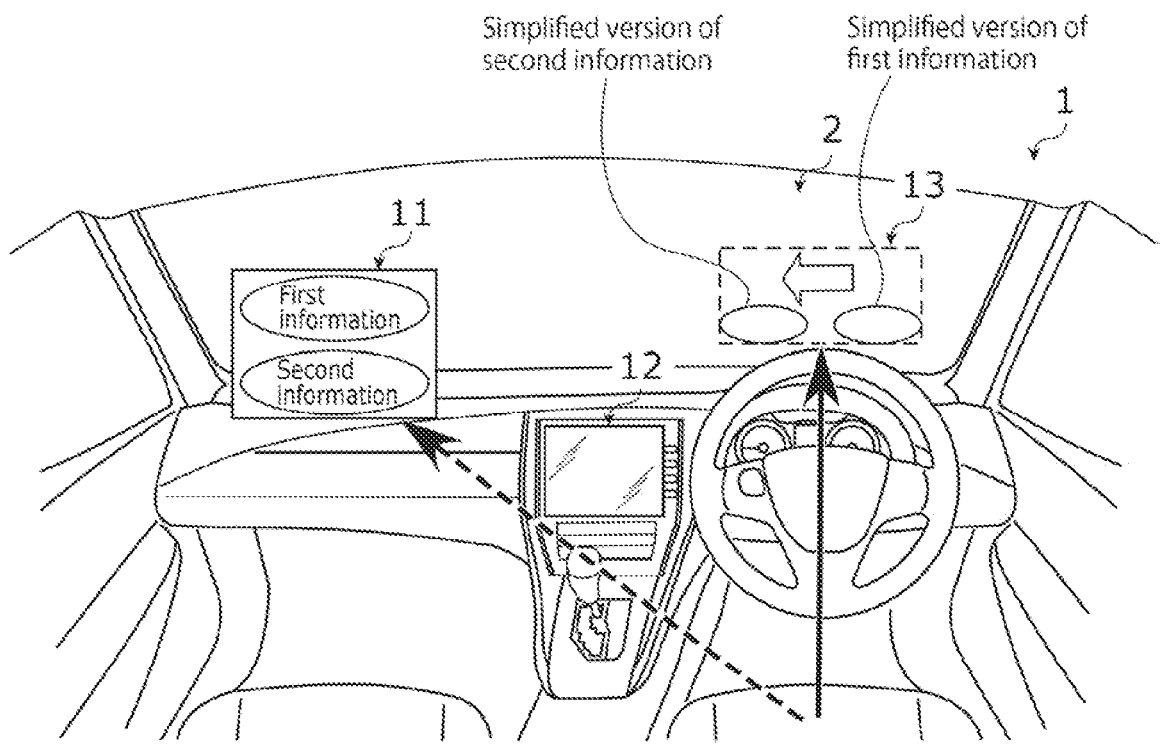
FIG. 11 illustrates a state in which the third display of a display control system according to Variation 6 of the embodiment is displaying simplified versions of first information and second information.

FIG. 11 illustrates a state in which third display 13 of display control system 2 according to Variation 6 of the embodiment is displaying a simplified version of first information and a simplified version of second information.

In display control device 20, display control system 2, and the display control method in Variation 6, third display 13 can display the simplified versions of the first information and the second information. In this respect, display control device 20, display control system 2, and the display control method in Variation 6 differ from those in the embodiment. The reference symbols assigned to the elements and functions of display control device 20, display control system 2, and the display control method in the embodiment are assigned to the corresponding elements and functions of display control device 20, display control system 2, and the display control method in Variation 6. Detailed explanations for the elements and functions are omitted.

After changing the display position of an information item, when controller 27 causes first display 11 to display the first information and the second information and when controller 27 causes second display 12 to display the first information and the second information, controller 27 causes third display 13 to display the simplified versions of the first information and the second information. When for instance a first event and a second event occur, controller 27 causes at least one display to display the first information and the second information. At this time, controller 27 also causes third display 13 to display the simplified versions of the first information and the second information. Here, the simplified versions of the first information and the second information include, for example, a simplified representation of the first information and a simplified representation of the second information.

In display control device 20 according to Variation 6, when controller 27 changes the display position of the second information to display the second information on first display 11, controller 27 causes third display 13 to display the simplified versions of the first information and the second information. Likewise, when controller 27 changes the display position of the first information to display the first information on second display 12, controller 27 causes third display 13 to display the simplified versions of the first information and the second information.

Thus, third display 13 can display the simplified versions of the first information and the second information. Accordingly, by just looking at third display 13, a driver can understand the first information and the second information. In addition, if the driver wants to see more details, by looking at a display pointed to by displayed guidance, the driver can perceive the first information and the second information.

Other Variations

The display control devices, the display control systems, and the display control method according to the present disclosure are described above on the basis of the embodiment and Variations 1 to 6 of the embodiment. However, the present disclosure is not limited to the descriptions in the embodiment and Variations 1 to 6 of the embodiment. The present disclosure may include one or more embodiments created by making changes envisioned by those skilled in the art to the embodiment and Variations 1 to 6 of the embodiment within the scope of the present disclosure.

Figure 12A:
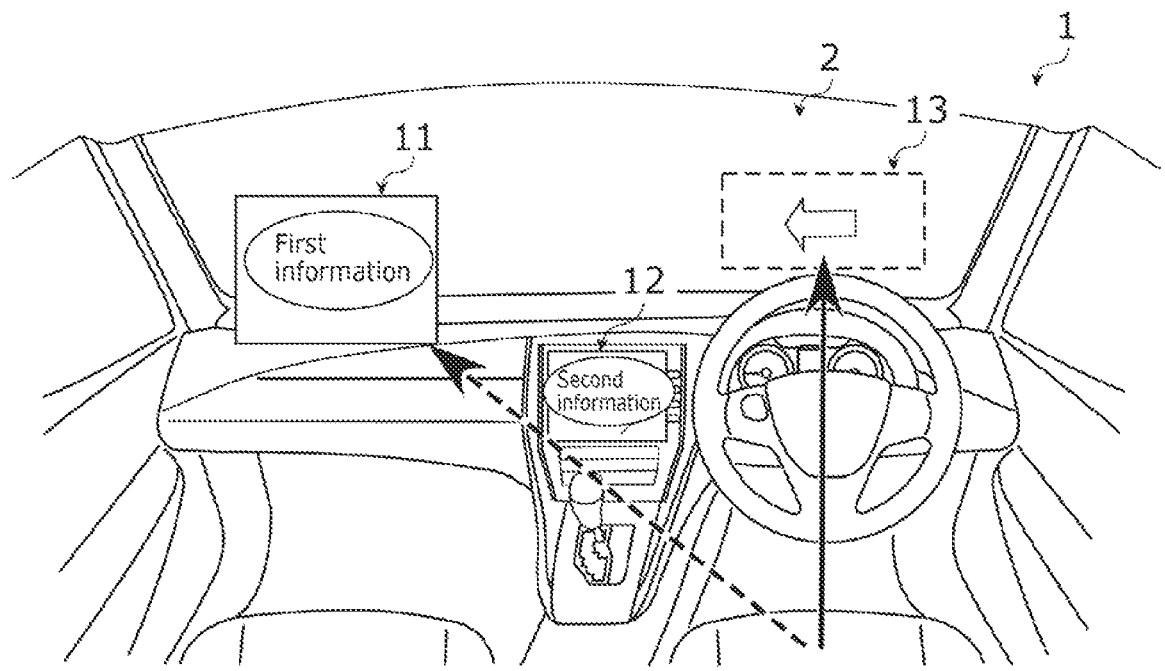
FIG. 12A illustrates a state in which the first display of a display control system according to other variations is displaying first information and the second display of the display control system is displaying second information.
Figure 12B:
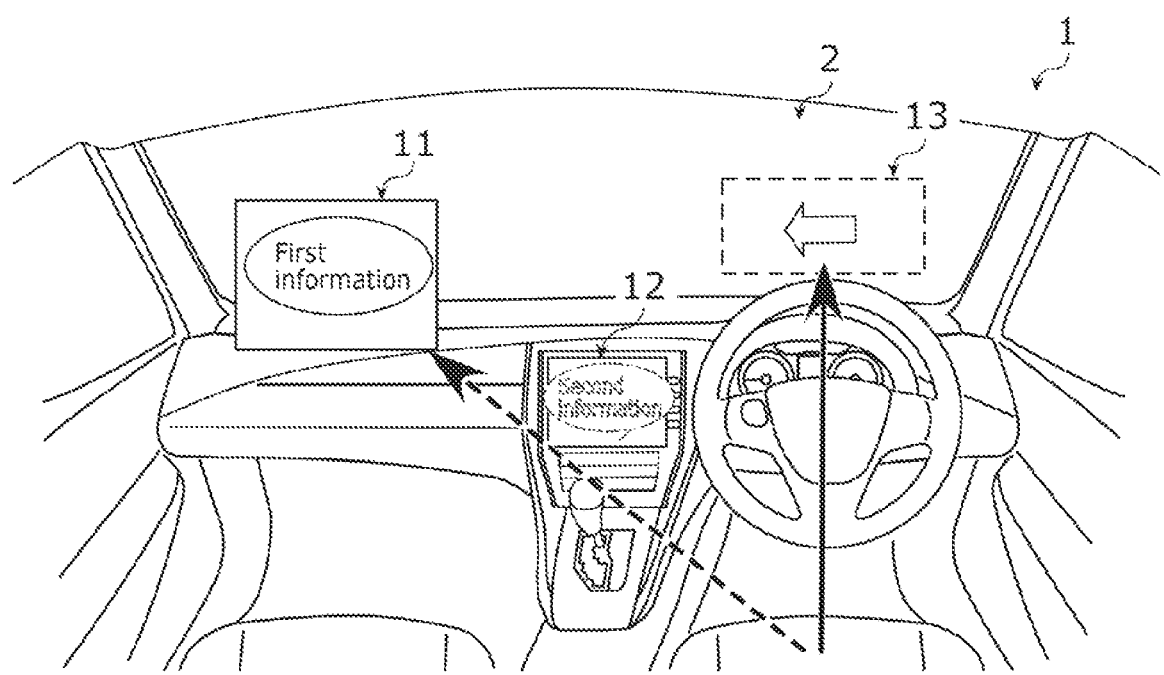
FIG. 12B illustrates a state in which the second display of the display control system according to the other variations stops displaying the second information.

For instance, in display control devices 20, display control systems 2, and the display control method according to the embodiment and Variations 1 to 6 of the embodiment, FIG. 12A illustrates a state in which first display 11 and second display 12 of display control system 2 according to other variations are displaying first information and second information, respectively. FIG. 12B illustrates a state in which second display 12 of display control system 2 according to the other variations stops displaying the second information. In FIG. 12B, the removed second information is illustrated by the long dashed double-short dashed line and the dotted hatching. As illustrated in FIGS. 12A and 12B, for example, consider a case in which a second event further occurs while first display 11 is displaying the first information because of the occurrence of a first event. In the situation, if the level of importance of the second information corresponding to the second event is less than a second value, controller 27 may display only the first information on first display 11 instead of displaying the first information and the second information together on first display 11. Here, controller 27 may cause second display 12 to display the second information and does not have to cause all the displays to display the second information. In this case, guidance display processor 24 may cause a display to display guidance that is a sign for guiding a driver's gaze only toward first display 11. In the above case, the first event occurs before the second event. However, the same applies to cases in which the first event further occurs while second display 12 is displaying the second information because of the occurrence of the second event (cases in which the second event occurs before the first event).

In display control devices 20, display control systems 2, and the display control method according to the embodiment and Variations 1 to 6 of the embodiment, if the level of importance of the third event is less than a third value, controller 27 does not have to cause first display 11 and second display 12 to display the third information corresponding to the third event. In addition, the third value may be a preset value. Thus, since information having a low level of importance is not displayed, at least one display displays only information having a level of importance greater than or equal to the third value. This makes it easier for a driver to exclusively look at information having a high level of importance, which facilitates driver's perception of the information having the high level of importance.

In addition, the display control devices and the display control devices included in the display control systems and the display control method according to the embodiment and Variations 1 to 6 of the embodiment are typically embodied as large-scale integrations (LSIs), which are integrated circuits. The elements of a display control device may be made as individual chips, or a part or all of the elements may be incorporated into one chip.

In addition, circuit integration is achieved not only by an LSI but also by a dedicated circuit or a general-purpose processor. A field programmable gate array (FPGA), which is an LSI that can be programmed after manufacturing or a reconfigurable processor in which the connections and settings of circuit cells inside an LSI are reconfigurable may be used.

It should be noted that in the embodiment and Variations 1 to 6 of the embodiment, each of the structural elements may be dedicated hardware or may be caused to function by running a software program suitable to the structural element. The structural element may be caused to function by a program running unit, such as a CPU or a processor, reading and running a software program stored in a storage medium, such as a hard disk or semiconductor memory.

In addition, all the numbers used in the above descriptions are provided as examples to specifically explain the present disclosure. In the embodiment in the present disclosure and Variations 1 to 6 of the embodiment, the numbers are provided for purposes of illustration and not limitation.

In addition, the configuration of the functional blocks illustrated in the block diagram is a mere example. Two or more functional blocks may be incorporated into one functional block. One functional block may be divided into more than one functional block. A part of the function may be transferred from one functional block to another functional block. The same hardware or software may process the functions of two or more functional blocks having similar functions in parallel or on a time-sharing basis.

The order in which the steps are performed in the flowchart is provided as an example to specifically explain the present disclosure. The steps may be performed in a different order. In addition, a part of the steps and another step may be performed simultaneously (in parallel).

It should be noted that the present disclosure includes one or more embodiments obtained by making various changes envisioned by those skilled in the art to the embodiment and Variations 1 to 6 of the embodiment and one or more embodiments obtained within the scope of the present disclosure through any combination of the structural elements and the functions described in the embodiment and Variations 1 to 6 of the embodiment.

While an embodiment has been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims is incorporated herein by reference in their entirety: Japanese Patent Application No. 2021-160167 filed on Sep. 29, 2021.

INDUSTRIAL APPLICABILITY

The present disclosure can be used in, for instance, vehicles equipped with display devices and devices and systems other than vehicles.

The invention claimed is:

1. A display control device used in a vehicle equipped with a first display that displays first information corresponding to a first event and a second display that displays second information corresponding to a second event, the display control device comprising:
  a processor that controls the first display and the second display to control displaying of the first information and the second information,
  wherein in a situation in which the processor obtains gaze information indicating a driver's gaze and the driver's gaze indicated by the gaze information obtained is directed at neither the first display nor the second display:
    in the situation, if the second event further occurs while the first display is displaying the first information because of occurrence of the first event, the processor changes a display position of the second information to display the second information at least on the first display, and
    in the situation, if the first event further occurs while the second display is displaying the second information because of occurrence of the second event, the processor changes a display position of the first information to display the first information at least on the second display.

2. The display control device according to claim 1,
  wherein the vehicle is equipped with a plurality of displays including the first display and the second display,
  the processor further identifies the driver's gaze to output the gaze information,
  the processor further determines that the driver's gaze indicated by the gaze information output by the gaze identifier is directed at one of the plurality of displays,
  the processor further identifies a third display as the one of the plurality of displays identified as a display which the driver's gaze is directed at among the plurality of displays and causes the third display identified to display guidance, and displaying of the guidance includes displaying of at least one sign for guiding the driver's gaze toward at least one display on which the first information is displayed after a change of the display position of the first information and displaying of at least one sign for guiding the driver's gaze toward at least one display on which the second information is displayed after a change of the display position of the second information.

3. The display control device according to claim 2, wherein if the driver's gaze indicated by the gaze information is directed at neither the first display nor the second display, the processor causes the third display to display the guidance.

4. The display control device according to claim 3, wherein if the driver's gaze is not directed at one or more displays pointed to by the guidance even after a predetermined period has elapsed since the third display started displaying the guidance, the processor causes the third display to stop displaying the guidance.

5. The display control device according to claim 2, wherein the processor further selects at least one display to be caused to display the first information from the first display and the second display, when the display position of the first information is changed and selects at least one display to be caused to display the second information from the first display and the second display, when the display position of the second information is changed, wherein the processor causes the at least one display selected to display the first information and the second information.

6. The display control device according to claim 5, wherein the processor identifies, from the first display and the second display, a display closer to a position of a gaze point based on the driver's gaze indicated by the gaze information and selects the display identified, and the processor causes the selected display closer to the position of the gaze point based on the driver's gaze to display the first information and the second information.

7. The display control device according to claim 5, wherein if a level of importance value set to the first information is greater than or equal to a first value, the processor changes a display state of the first information and causes the at least one display selected to display the first information whose display state has been changed and the second information, and if a level of importance value set to the second information is greater than or equal to the first value, the processor changes a display state of the second information and causes the at least one display selected to display the first information and the second information whose display state has been changed.

8. The display control device according to claim 7, wherein displaying the first information in a changed display state and displaying the second information in a changed display state include displaying in an enlarged size, displaying in a color different from an original color, displaying at a position different from an original position, and displaying in a blinking state.

9. The display control device according to claim 6, wherein according to a level of importance value set to the first information and a level of importance value set to the second information, the processor extracts, from the first information and the second information, at least one information item having a level of importance value greater than or equal to a second value, and the processor causes the display selected to display the first information, the second information, and at least one relevant information item related to the at least one information item having the level of importance value greater than or equal to the second value and extracted by the processor.

10. The display control device according to claim 1, wherein according to a level of importance value set to the first information and a level of importance value set to the second information, the processor extracts, from the first information and the second information, at least one information item having a level of importance value less than a second value, and the processor removes the at least one information item from at least one display displaying the at least one information item, the at least one information item having the level of importance value less than the second value and having been extracted by the processor.

11. The display control device according to claim 1, wherein after changing the display position of the second information to display the second information on the first display, the processor causes the first display to display information regarding the first display, information regarding the second display, the first information, and the second information, and after changing the display position of the first information to display the first information on the second display, the processor causes the second display to display the information regarding the first display, the information regarding the second display, the first information, and the second information.

12. The display control device according to claim 2, wherein after changing the display position of the second information to display the second information on the first display, the processor causes the third display to display a simplified version of the first information and a simplified version of the second information, and after changing the display position of the first information to display the first information on the second display, the processor causes the third display to display the simplified version of the first information and the simplified version of the second information.

13. The display control device according to claim 1, wherein in the situation in which the driver's gaze indicated by the gaze information obtained is directed at neither the first display nor the second display, if a third event further occurs while the first display is displaying the first information and the second information because of occurrence of the first event and the second event, the processor changes a display position of third information corresponding to the third event to display the third information on the first display, and if the third event further occurs while the second display is displaying the first information and the second information because of the occurrence of the first event and the second event, the processor changes the display position of the third information corresponding to the third event to display the third information on the second display.

14. The display control device according to claim 13, wherein if a level of importance value of the third event is less than a third value, the processor does not allow the first display and the second display to display the third information corresponding to the third event.

15. The display control device according to claim 1, wherein the processor changes the display position of the first information to display the first information on both of the first display and the second display at the same time, and the processor changes the display position of the second information to display the second information on both of the first display and the second display at the same time.

16. A display control system comprising:
a first display;
a second display; and
the display control device according to claim 1 that controls displaying by the first display and the second display.

17. The display control device according to claim 2, wherein the vehicle is equipped with only three displays including the first display, the second display and the third display.

18. The display control device according to claim 1, wherein
the first event and the second event include at least one of a decreased distance between the vehicle and an obstacle, provision of route guidance, occurrence of an accident or a disaster, an indication of an insufficient amount of remaining gasoline, occurrence of traffic jam, or occurrence of road closure, and
the first information and the second information include at least one of surrounding information including information indicating the approach of an obstacle, navigation information including information indicating the route guidance, disaster information including information indicating a location of the accident or the disaster and a description of the accident or the disaster, measuring-instrument information including information indicating the insufficient amount of remaining gasoline, or traffic information including information indicating a congested location and a road closed to traffic.

19. The display control device according to claim 1, wherein
in the situation, when the second event further occurs, the processor determines whether the first display is displaying the first information because of the occurrence of the first event; and
if the processor determines that the first display is displaying the first information because of the occurrence of the first event, the processor changes the display position of the second information corresponding to the further occurred second event to display the second information at least on the first display, and
in the situation, when the first event further occurs, the processor determines whether the second display is displaying the second information because of the occurrence of the second event; and
if the processor determines that the second display is displaying the second information because of the occurrence of the second event, the processor changes the display position of the first information corresponding to the further occurred first event to display the first information at least on the second display.

20. A display control method used in a vehicle equipped with a first display that displays first information corresponding to a first event and a second display that displays second information corresponding to a second event, the method comprising:
controlling, by a computer, the first display and the second display to control displaying of the first information and the second information, wherein
in a situation in which the computer obtains gaze information indicating a driver's gaze and the driver's gaze indicated by the gaze information obtained is directed at neither the first display nor the second display:
in the situation, if the second event further occurs while the first display is displaying the first information because of occurrence of the first event, the computer changes a display position of the second information to display the second information at least on the first display, and
in the situation, if the first event further occurs while the second display is displaying the second information because of occurrence of the second event, the computer changes a display position of the first information to display the first information at least on the second display.

* * * * *